(12) United States Patent
Sasaki

(10) Patent No.: US 10,044,900 B2
(45) Date of Patent: Aug. 7, 2018

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Hidemi Sasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/295,055

(22) Filed: Oct. 17, 2016

(65) Prior Publication Data

US 2017/0126925 A1 May 4, 2017

(30) Foreign Application Priority Data

Oct. 30, 2015 (JP) .................................. 2015-214810

(51) Int. Cl.
*G03G 15/00* (2006.01)
*H04N 1/32* (2006.01)
*H04N 1/00* (2006.01)

(52) U.S. Cl.
CPC ....... *H04N 1/32101* (2013.01); *G03G 15/553* (2013.01); *H04N 1/00832* (2013.01); *H04N 2201/0094* (2013.01)

(58) Field of Classification Search
CPC ............... G03G 15/553; G03G 15/556; H04N 1/32101–1/32122
See application file for complete search history.

(56) References Cited

U.S. PATENT DOCUMENTS

| 7,986,888 | B2 | 7/2011 | Hibino | |
|---|---|---|---|---|
| 2003/0163574 | A1* | 8/2003 | Tohki | H04L 51/30 709/228 |
| 2008/0240745 | A1* | 10/2008 | Hibino | G03G 15/553 399/24 |
| 2012/0327451 | A1* | 12/2012 | Miller | G03G 15/553 358/1.14 |
| 2014/0023382 | A1* | 1/2014 | Kawana | G03G 15/556 399/8 |
| 2014/0186061 | A1* | 7/2014 | Hayakawa | G03G 15/0863 399/24 |
| 2017/0075270 | A1* | 3/2017 | Saiki | G03G 15/50 |

FOREIGN PATENT DOCUMENTS

JP 4985040 B 5/2012

* cited by examiner

*Primary Examiner* — Carla Therrien
(74) *Attorney, Agent, or Firm* — Fitzpatrick, Cella, Harper & Scinto

(57) ABSTRACT

An image forming apparatus that attaches a consumable including a memory that stores information for indicating use results of a consumable material and that forms an image by using the consumable material accommodated in the consumable, in a case that an obtainment of information from the attached consumable succeeds, creates a record of the attached consumable based on the obtained information, and in a case that the obtainment of the information fails, creates a record of the attached consumable that makes identification information of the attached consumable be predetermined information. Then, in a case that identification information of the consumable included in obtained the information does not match identification information of the consumable obtained previously, changes the identification information of the consumable obtained previously based on the information obtained currently.

13 Claims, 23 Drawing Sheets

F I G. 3A
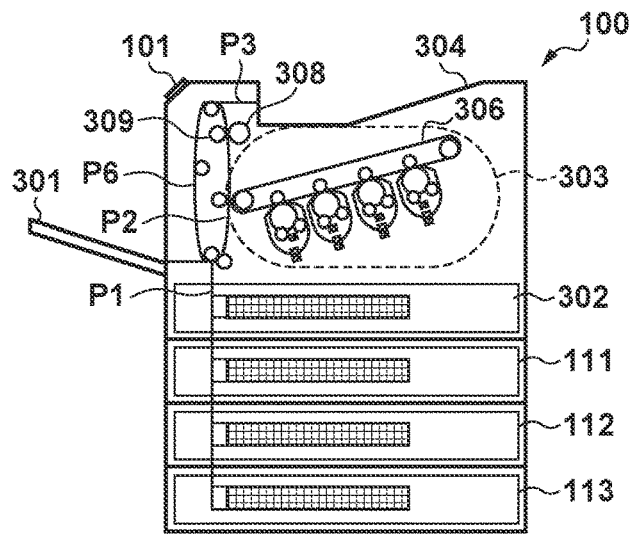
F I G. 3B
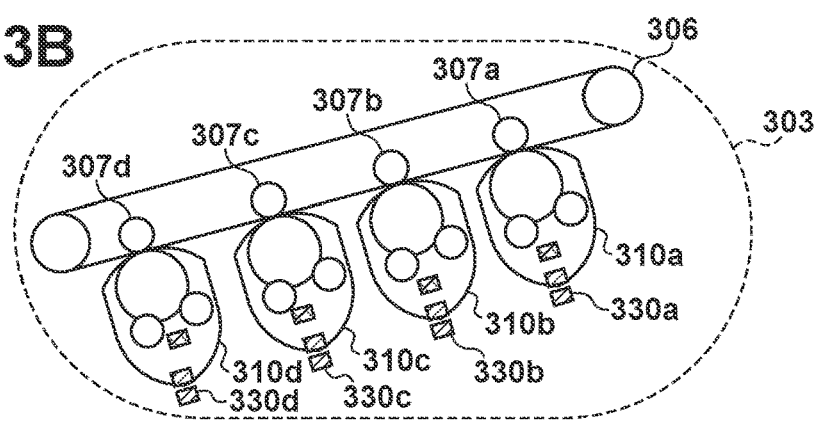
F I G. 3C
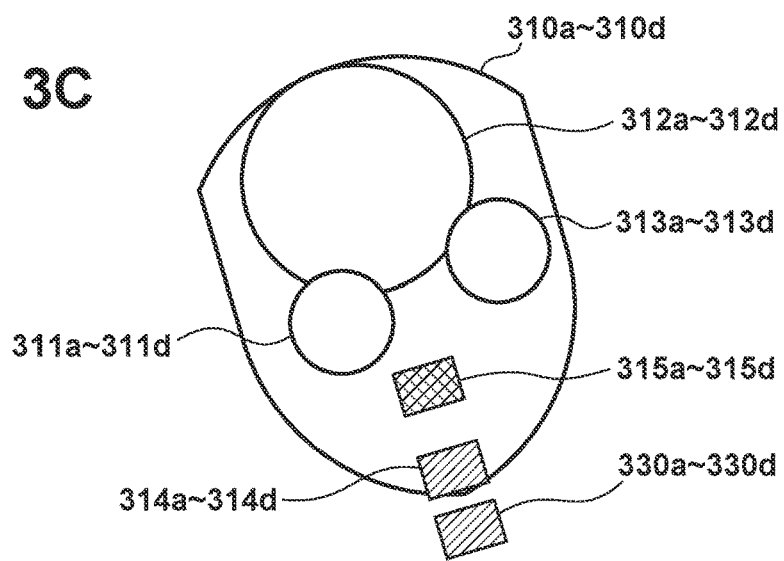

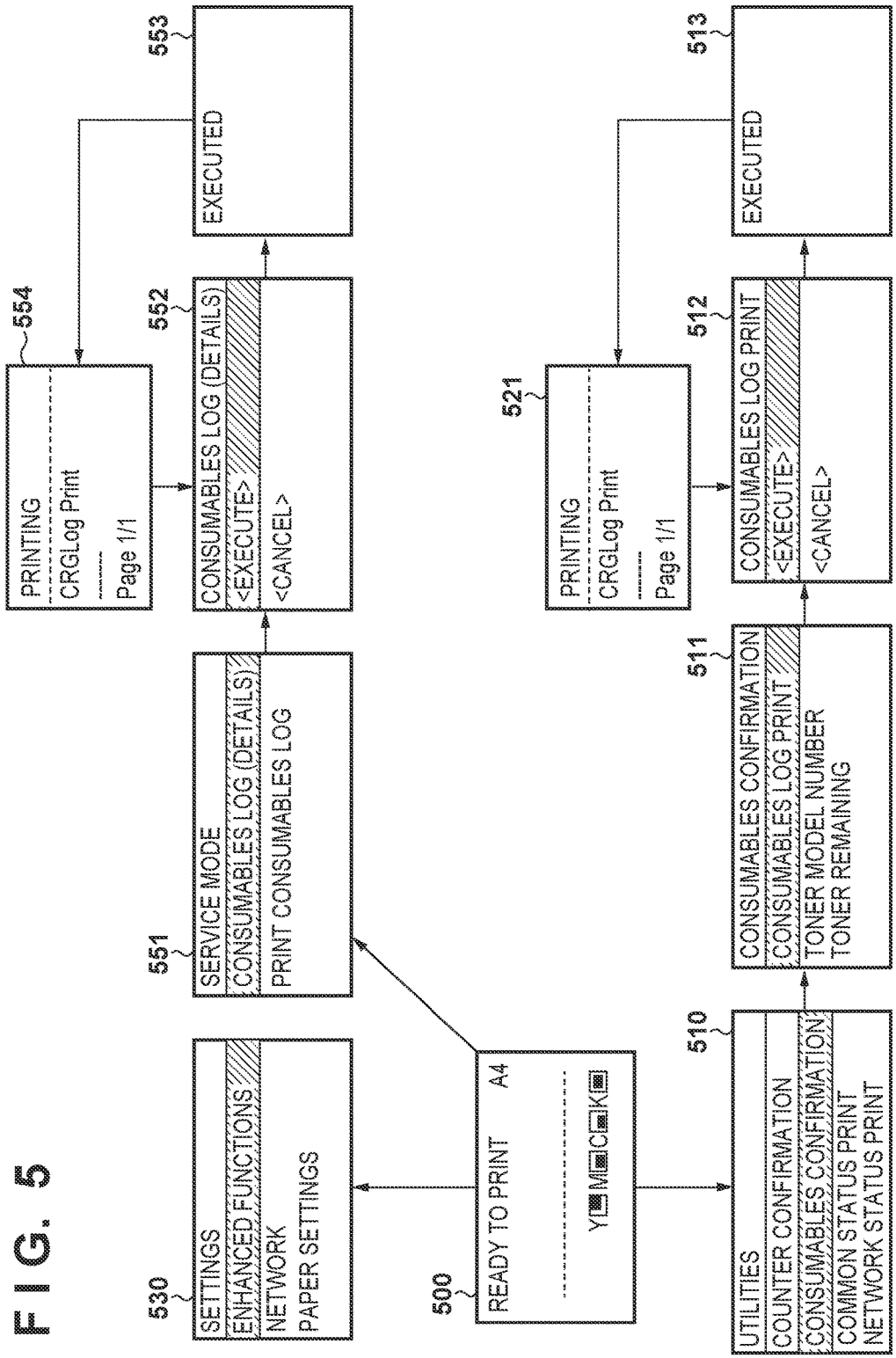

FIG. 6A

CARTRIDGE REPLACEMENT LOG
OTHER COMPANY CRG: xx
COMMUNICATION ERROR: xx

Y | M
C | K

Page Count: xxxx

FIG. 6B

CARTRIDGE REPLACEMENT LOG (DETAILS)
OTHER COMPANY CRG: xx
COMMUNICATION ERROR: xx

Y
C

Page Count: xxxx

F I G. 6C

| SERIAL NUMBER | SIZE | USAGE START TIME | PAGE COUNT | REMAINING | LATEST USAGE TIME | PAGE COUNT | REMAINING | TYPE |
|---|---|---|---|---|---|---|---|---|
| 0123456789 | STARTER | 2015 01/01 10:05 | 000000000 | 100% | 2015 03/04 12:34 | 000028923 | 0% | GENUINE |
| 0987654321 | STANDARD | 2015 03/04 12:51 | 000000012 | 100% | 2015 06/06 15:15 | 000032511 | 1% | OEM |
| UNKNOWN | LARGE | 2015 06/07 9:20 | --------- | 100% | 2015 06/21 15:34 | --------- | 2% | TAGLESS |
| 2358132134 | STANDARD | 2015 06/21 21:20 | 000000000 | 100% | 2015 06/22 13:31 | 000012345 | 35% | COPY TAG |

F I G. 6D

| SERIAL NUMBER | SIZE | USAGE START TIME | PAGE COUNT | RE-MAINING | TONER | DRUM | DEVEL-OPER | LATEST USAGE TIME | PAGE COUNT | RE-MAINING | TONER | DRUM | DEVEL-OPER | TYPE |
|---|---|---|---|---|---|---|---|---|---|---|---|---|---|---|
| 0123456789 | STARTER | 2015 01/01 10:05 | 000000000 | 100% | 100% | 100% | 100% | 2015 03/04 12:34 | 000028923 | 0% | 0% | 10% | 18% | GENUINE |
| 0987654321 | STANDARD | 2015 03/04 12:51 | 000000012 | 100% | 100% | 100% | 100% | 2015 06/06 15:15 | 000032511 | 1% | 3% | 1% | 4% | OEM |
| UNKNOWN | LARGE | 2015 06/07 9:20 | --------- | 100% | 100% | --------- | | 2015 06/21 15:34 | --------- | 2% | 2% | --------- | --------- | TAGLESS |
| 2358132134 | STANDARD | 2015 06/21 21:20 | 000000000 | 100% | 100% | 100% | 100% | 2015 06/22 13:31 | 000012345 | 35% | 38% | 35% | 42% | COPY TAG |

FIG. 9A

| | +00h | +01h | +02h | +03h | +04h | +05h | +06h | +07h |
|---|---|---|---|---|---|---|---|---|
| 901 | +00h | | | Magic Number "CRG-LOG/0" | | | | |
| | +08h | Y DATA NUMBER (16 bits) | | M DATA NUMBER (16 bits) | | C DATA NUMBER (16 bits) | | K DATA NUMBER (16 bits) |
| 902 | | +09h | +0Ah | +0Bh | +0Ch | +0Dh | +0Eh | +0Fh |
| | +10h | | | | | | | |
| | | +11h | +12h | +13h | +14h | +15h | +16h | +17h |
| 903 | +10h | ERROR TAG CRG CUMULATIVE USE COUNT (16 bits) | | TAGLESS CRG CUMULATIVE USE COUNT (16 bits) | | RESERVE | | |
| | +18h | RESERVE | | | RESERVE | | | |
| | | +19h | +1Ah | +1Bh | +1Ch | +1Dh | +1Eh | +1Fh |

FIG. 9B

| | +00h | +01h | +02h | +03h | +04h | +05h | +06h | +07h |
|---|---|---|---|---|---|---|---|---|
| +00h | EventType (1 bit) | RESERVE (1 bit) | RESERVE (1 bit) | RESERVE (1 bit) | DATE/TIME (32 bits) | | | |
| | CARTRIDGE LIFE SPAN (7 bits) | TONER REMAINING (7 bits) | DRUM LIFE SPAN (7 bits) | DEVELOPER LIFE SPAN (7 bits) | | | | |
| +08h | TAG TYPE (4 bits) | CARTRIDGE PAGE COUNT (24 bits) | | | CARTRIDGE SERIAL NUMBER (32 bits) | | | |
| | SIZE TYPE (4 bits) | | | | | | | |
| | +08h | +09h | +0Ah | +0Bh | +0Ch | +0Dh | +0Eh | +0Fh |

FIG. 9C

| HEADER |
|---|
| Y[0] ⋮ Y[399] |
| M[0] ⋮ M[399] |
| C[0] ⋮ C[399] |
| K[0] ⋮ K[399] |

FIG. 9D

| HEADER |
|---|
| K[0] ⋮ K[1599] |

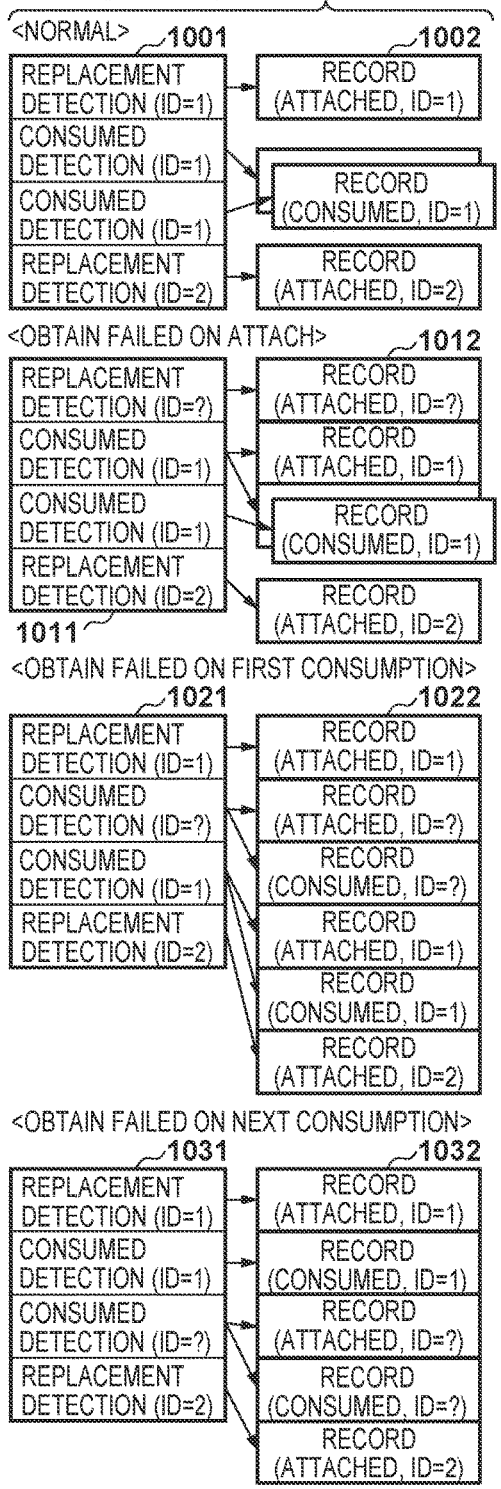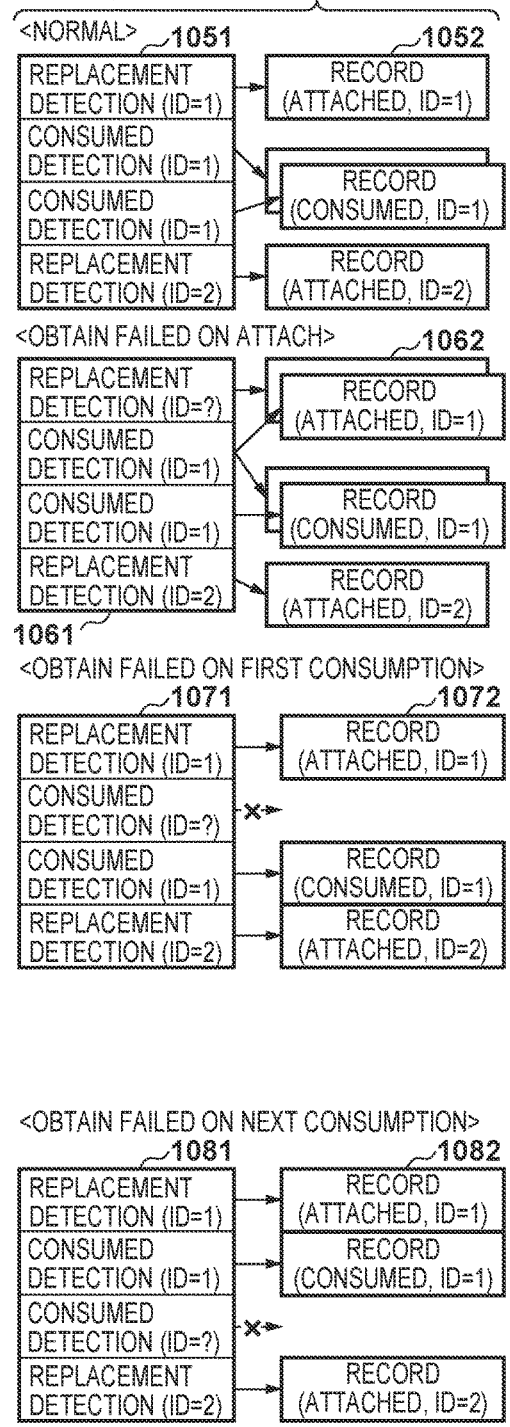

F I G. 15B
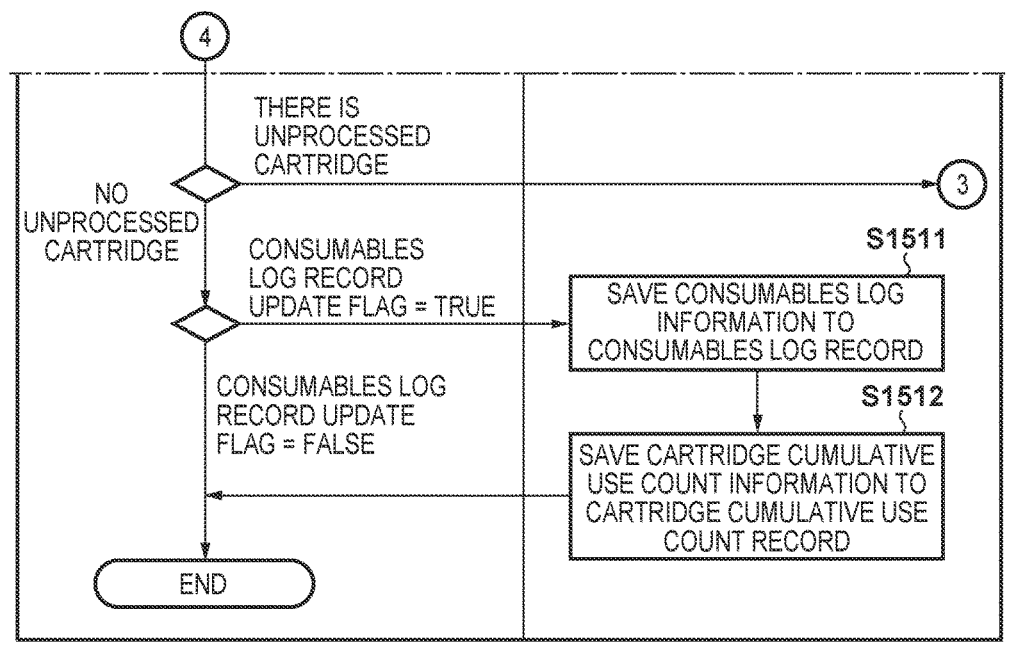

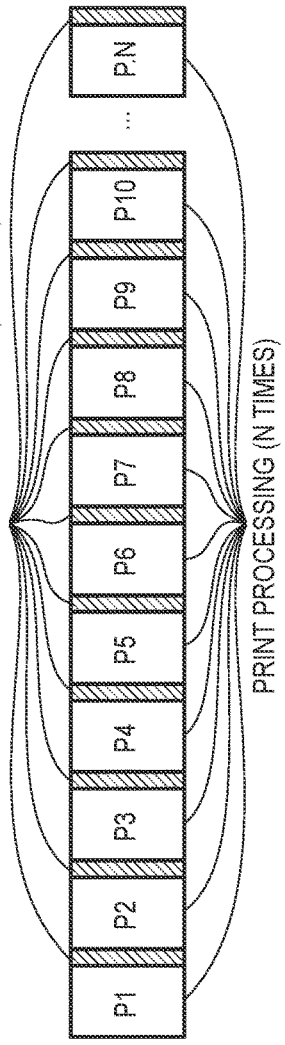
F I G. 18A
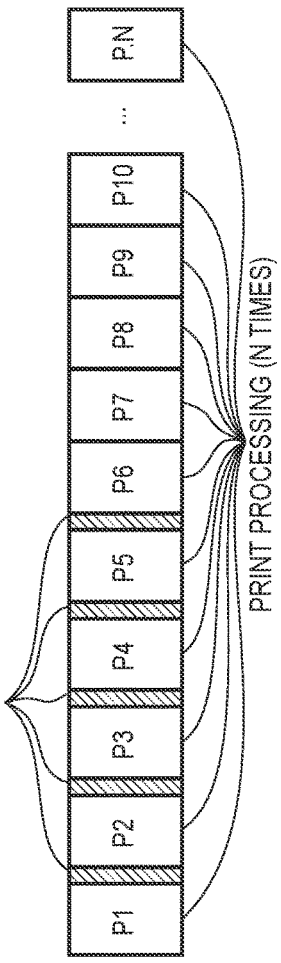
F I G. 18B
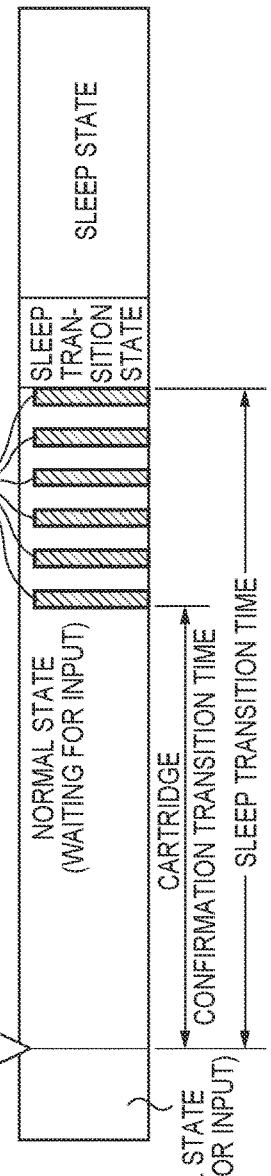
F I G. 18C

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

An image forming apparatus, which attaches a toner or ink cartridge including a storage medium (hereinafter referred to as a memory tag), and every time consumables such as the ink or toner are consumed, records history information which includes the consumption amount, the number of printed sheets, and the like to the memory tag is known. With this, the remaining amount of consumables in the cartridges can be estimated with precision by handing over the information when the cartridges are attached to another image forming apparatus. Additionally, an image forming apparatus which records toner replacement results by holding results of printing by the cartridge, the replacement date/time, a serial number (ID) of the cartridge or the like to a storage area of the image forming apparatus at a time of an attachment or a replacement of a cartridge is also known (Japanese Patent No. 4985040 for example).

There are cases in which, other than a predetermined cartridges (for example, genuine cartridges that the manufacturer of an image forming apparatus provides), other type of cartridge (for example, a cartridge that another company provides) is attached in the image forming apparatus. However, consumables included in a cartridge of another company are not limited to necessarily having the same characteristics as consumables included within the genuine cartridge. For this reason, there exist cases in which differences in color development or color reproducibility arise if the cartridge of another company is used compared to if the genuine cartridge is used.

It is considered that in accordance with storing in the main body of the image forming apparatus a replacement history of cartridges attached to the image forming apparatus as a consumables log and printing the consumables log, the consumables log will be used in an analysis of the cause of a problem when one occurs. However, communication between the cartridge and the main body can incidentally fail in cases when a contact portion which connects between the image forming apparatus and the cartridge is dirty and in cases of contact failure. Also, communication failing between the cartridge and the main body due to a difference in communication timing or the like when the cartridge of another company has a memory tag which is different from what is employed in the genuine cartridge attached thereto is envisioned. Also, there exist cartridges of other companies which do not include a memory tag. In such cases, communication between the image forming apparatus and the cartridge will inevitably fail. If a communication error between the image forming apparatus and the cartridge occurs, it cannot be distinguished whether it is an incidental communication error caused by a contact defect or the like or an inevitable communication error caused by the non-existence of a memory tag. For this reason, there is a problem in that when a problem relating to the cartridge is investigated, it is unknown which cartridge the image forming apparatus was using, and it is impossible to sufficiently handle such a problem.

SUMMARY OF THE INVENTION

An aspect of the present invention is to eliminate the above-mentioned problems with the conventional techniques.

A feature of the present invention is to provide a technique in which it is possible to manage information of a consumable in accordance with whether a communication error is caused by a memory not being included or whether it is an incidental communication error in a case when a communication error with the consumable occurs.

According to a first aspect of the present invention, there is provided an image forming apparatus that attaches a consumable including a memory that stores information for indicating use results of a consumable material and that forms an image by using the consumable material accommodated in the consumable, the apparatus comprising: at least one processor; and at least one memory having instructions stored thereon which, when executed by the at least one processor, cause the image forming apparatus to: obtain the information from an attached consumable; create a record of the attached consumable based on the obtained information in a case that an obtaining of the information succeeds in an obtainment of the information, and create a record of the attached consumable that makes identification information of the attached consumable be predetermined information in a case that the obtaining of the information fails in the obtainment of the information; and change the identification information of the consumable that was obtained previously based on the information that is currently obtained in a case that identification information of the consumable included in the information that is currently obtained does not match identification information of the consumable that was obtained previously.

According to a second aspect of the present invention, there is provided a method of controlling an image forming apparatus that attaches a consumable including a memory that stores information for indicating use results of a consumable material and that forms an image by using the consumable material accommodated in the consumable, the method comprising: obtaining the information from an attached consumable; in a case that the obtaining of the information succeeds, creating a record of the attached consumable based on the obtained information, and in a case that the obtaining of the information fails, creating a record of the attached consumable that makes identification information of the attached consumable be predetermined information; and in a case that identification information of the consumable included in the obtained information does not match identification information of the consumable obtained previously, changing the identification information of the consumable obtained previously based on the information obtained currently.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3C depict cross-sectional views for describing a configuration of a printer engine of the image forming apparatus according to the embodiment.

FIG. 5 depicts a view for describing transitions of screens displayed on a display unit of an operation unit when a report printing function is executed in the image forming apparatus according to the embodiment.

FIGS. 6A-6D depict views for describing an example of a print of consumables logs by the image forming apparatus according to the embodiment.

FIGS. 9A-9D depict views representing as a schematic diagram formats of information held in an HDD of the image forming apparatus according to the embodiment.

FIGS. 10A and 10B depict views illustrating one example of transitions of consumables log information according to a first embodiment of the present invention.

FIGS. 15A and 15B are flowcharts for describing processing of a detection of a replacement of a consumable that the main program of the image forming apparatus executes as an agent according to the first embodiment.

FIGS. 18A-18C depict views illustrating an example of a timing at which existence confirmation of a memory tag is performed by an image forming apparatus according to the first embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
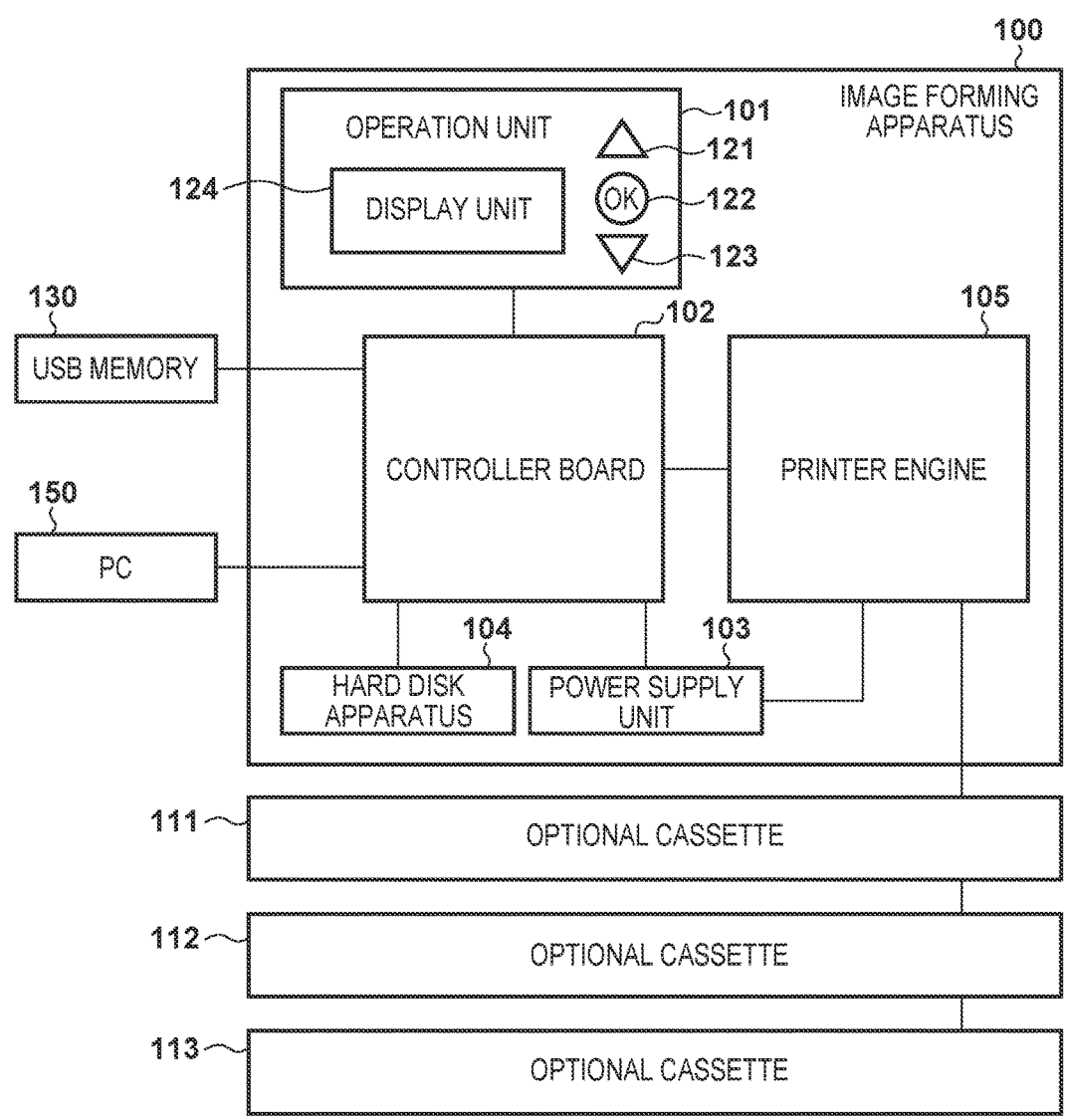
FIG. 1 is a block diagram for describing a configuration of an image forming apparatus according to an embodiment of the present invention.

FIG. 1 is a block diagram for describing a configuration of an image forming apparatus 100 according to an embodiment of the present invention.

A PC 150 is, for example, a personal computer, and the PC 150 may be a notebook type, may be a desktop type, or may be a thin client. Alternatively, it may be a mobile terminal which includes a mobile telephone or a smart phone. Any information processing apparatus can be employed as the PC 150. The PC 150 is connected to the image forming apparatus 100 via a communication interface such as a LAN (Local Area Network). The PC 150 and the image forming apparatus 100, rather than being in a configuration in which they are directly connected by the network cable, may be indirectly connected via a network hub. Alternatively, they may be indirectly connected via the Internet, an intranet, or the like. Rather the connection between the image forming apparatus 100 and the PC 150 being by a wired network cable, it may be a wireless connection. An application operating on the PC 150 provides print settings such as for a size and a type of paper used in a print, or commands which render drawings or characters to a printer driver which similarly operates on the PC 150. With this, the printer driver creates a print job based on the print settings and the rendering commands and transmits the print job to the image forming apparatus 100 to cause a print.

The image forming apparatus 100 has an operation unit 101, a controller board (control unit) 102, a power supply unit 103, a hard disk device (HDD) 104, and a printer engine 105. Also, optional cassettes 111, 112, and 113 which accommodate papers are arranged in the image forming apparatus 100. Also, other than paper feed sources such as these optional cassettes, a deck or the like which can accommodate a large amount of paper may be connected. The controller board 102 controls operation of the entire image forming apparatus 100 by outputting instructions to each unit. Details of the controller board 102 will be described later in detail with reference to FIG. 2.

The operation unit 101 accepts instructions from a user to the image forming apparatus 100 and also makes a notification of the state of the image forming apparatus 100 to the user. The operation unit 101 includes an upward button 121, an execution button 122, and a downward button 123 for accepting instructions, and a display unit 124 for displaying a menu screen and the like and for making notifications of the states of the image forming apparatus 100. The upward button 121 and the downward button 123 are operation buttons for causing a transition of a cursor in vertical directions on a screen of the display unit 124 for selecting items displayed on the display unit 124. The execution button 122 is an operation button for causing a selection of an item instructed by the cursor or an execution. Note, configuration may also be taken such that, by a touch panel function being arranged on the display unit 124, a desired function or instruction is input by a user directly touching an item displayed on the display unit 124. Also, the unit which accepts an operation instruction by speech input or the like may be arranged.

An HDD 104 stores programs executed by a CPU 201 (FIG. 2) of the controller board 102 and is used to temporarily store print jobs received from the PC 150. Furthermore, the HDD 104 is used to temporarily hold image data rendered based on print jobs before printing by the printer engine 105. Note, the HDD 104 may be realized by a storage module such as a solid state drive (SSD) for example.

The power supply unit 103 is connected to a commercial AC power supply, and is a power supply for supplying an electric power to the controller board 102 or the printer engine 105. The printer engine 105 feeds paper from a paper feed source in accordance with a print setting instructed from the controller board 102, and prints an image onto a paper in accordance with image data supplied from the controller board 102. The printer engine 105 can control the optional cassettes 111 through 113 and operates as the image forming apparatus as a whole. These will be described in more detail with reference to FIG. 3A through FIG. 3C.

A USB memory 130 is used in order to store print jobs for example. A configuration can be taken in which a user of the image forming apparatus 100 attaches the USB memory 130, which is storing a print job, to the image forming apparatus 100, and cause print processing according to the stored print job to execute by providing an instruction from the operation unit 101. In such cases, a print job is generated by the image forming apparatus 100 based on print settings performed by the operation unit 101. Note, the image forming apparatus 100 according to the embodiment may be a multifunction peripheral having a scanner function and a FAX function for example, rather than being limited to a printer specializing in print functions.

Also, a configuration can be adopted in which the controller board 102 and the printer engine 105 are divided into separate housings (a so-called configuration of an image forming system accompanying a printer server). Also, configuration may be taken such that a server on a cloud service handles some of the functions that the controller board 102 handles. Also, configuration may be taken such that the PC 150 handles functions corresponding to the controller board 102, and the image forming apparatus 100 specializes in control of the printer engine 105.

Figure 2:
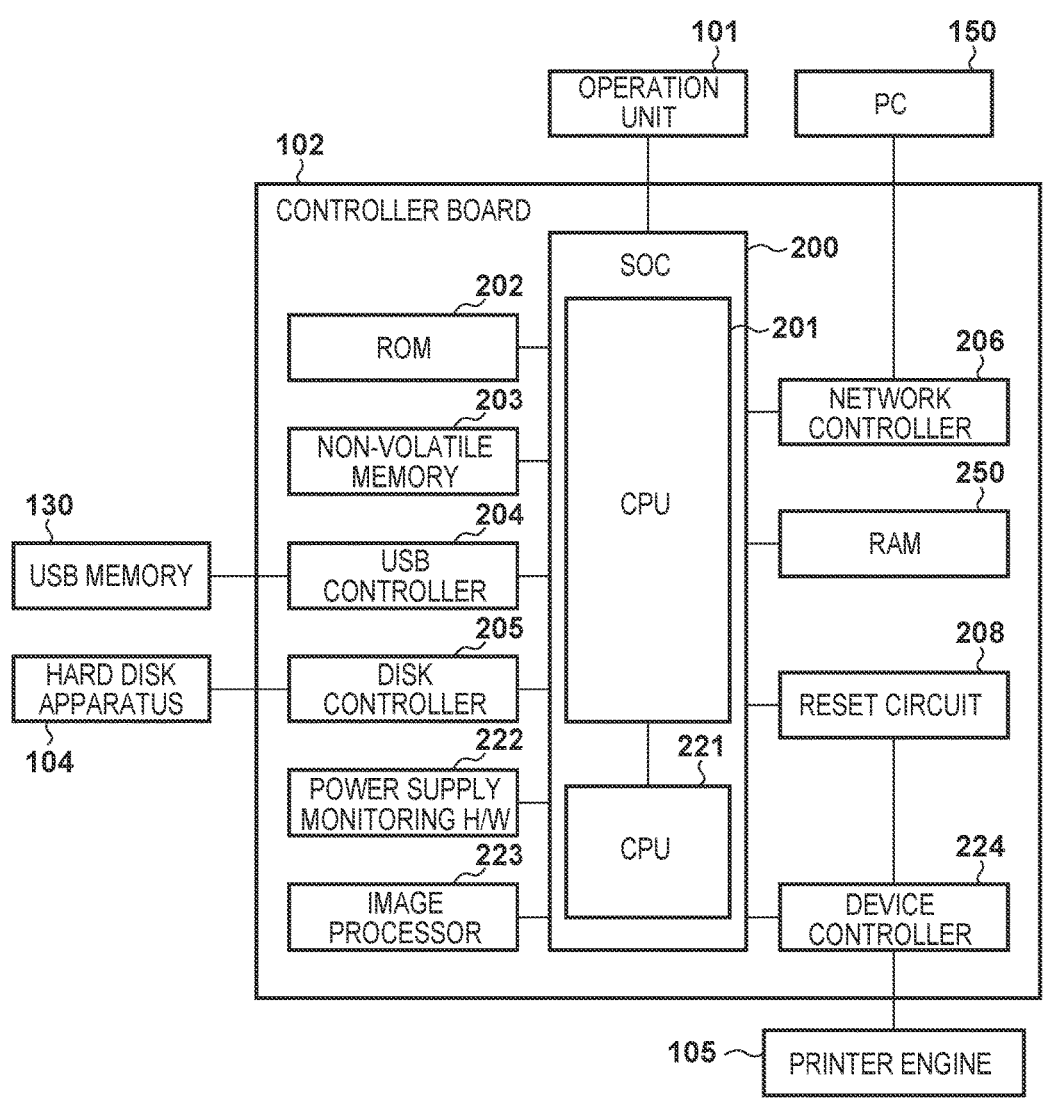
FIG. 2 is a block diagram for describing a configuration of a controller board of the image forming apparatus according to the embodiment.

FIG. 2 is a block diagram for describing a configuration of the controller board 102 of the image forming apparatus 100 according to the embodiment. Note, although hardware of CPU peripherals such as a chip set, a bus bridge, and a clock generator may be included in large numbers in the controller board 102, description would be complicated, and therefore illustration is omitted in the present figure.

An SOC 200, a ROM 202, a non-volatile memory 203, a USB controller 204, a disk controller 205, a network controller 206, a reset circuit 208, and a RAM 250 are included in the controller board 102. Furthermore, power supply monitoring H/W (hardware) 222, an image processor 223, and a device controller 224 are also included in the controller board 102.

The SOC 200 is an integrated circuit implemented by System-on-a-chip technology and has the CPU 201 and a CPU 221. The CPU 201 and the CPU 221 which are included in the SOC 200 can share/transmit various information through an internal bus. The CPU 201 is a main CPU that transmits/receives data via the network controller 206 and that processes the data. Meanwhile, the CPU 221 is a sub-CPU for controlling the printer engine 105 in real time. Note, in the present embodiment, although description is given having a configuration causing a distribution of processing between two CPUs, a configuration may be taken such that the processing is realized by one CPU or realized with 3 or more CPUs for example, rather than necessarily being bound to this restriction.

The CPU 201 is a central arithmetic processing device for controlling each module included in the SOC 200. The ROM 202 stores an initialization program of the CPU 201. The initialization program (boot program) which is read and executed by the CPU 201 immediately after power activation in the image forming apparatus 100 is stored in the ROM 202. In the initialization program, necessary commands are included for the CPU 201 to read programs from the HDD 104 and deploy the programs to the RAM 250. The non-volatile memory 203 stores setting information of the image forming apparatus 100, counter information relating to printing, and the like. The non-volatile memory 203 can hold information even if the power supply of the image forming apparatus 100 is cut, and the CPU 201 can access the non-volatile memory 203 to reference a value prior to the power disconnection when the power supply is activated once again. The USB controller 204 controls communication with devices connected via a Universal Serial Bus (the USB memory 130 here). In the embodiment, input and output of data to the USB memory 130 are controlled. As a separate configuration, the image forming apparatus 100 may operate as a peripheral device of the PC 150 by connecting the image forming apparatus 100 to the PC 150 via a USB cable, and controlling input and output by the USB controller 204. The disk controller 205 controls input and output with the HDD 104. The network controller 206 performs input and output of data with the PC 150 via a network cable. Note, as previously described, in addition to the network controller 206 connecting to the PC 150 by wire, it can also be of a configuration in which it connects wirelessly. The reset circuit 208 is a circuit for resetting hardware (H/W) of the controller board 102.

The CPU 221 is a central arithmetic processing device for controlling each module included in the SOC 200. The power supply monitoring H/W 222 monitors a power supply control of the image forming apparatus 100. If the CPU 221 can normally operate, the reset circuit 208 can apply a reset of the whole image forming apparatus 100 in accordance with an instruction of the CPU 221. Also, the power supply monitoring H/W 222 can supply the electric power to the controller board 102 in accordance with an input of the power supply switch (not shown) in a state in which the electric power is not supplied to the CPU 221. The power supply monitoring H/W 222 may be additionally realized by a small scale system which is operated by a separate CPU. The image processor 223 performs digital image processing in real time. For example, the image processor 223 performs image processing which converts a DisplayList (intermediate data), which is obtained by analyzing a print job, into a contone image. Also, the image processor 223 performs image processing for dithering processing which generates image data represented in halftone that can be printed by the printer engine 105 based on the contone image. Also, the image processor 223 performs processing which reorganizes the image data in plane sequential. In addition, the image processor 223 may also perform image processing in which the contone image is adjusted to a preferred color for a user. The image processor 223 can be realized by an ASIC (application specific integrated circuit). Alternatively, the image processor 223 can also be realized by an FPGA (field-programmable gate array). Note, in the embodiment, description will be given with the assumption that real-time digital image processing is performed by the image processor 223. In contrast, such processing may be realized by a configuration in which some or all of the processing is handled by the CPU 201 or the CPU 221. The device controller 224 controls the interface with the printer engine 105. The RAM 250 is a main memory of which access is possible from the CPU 201 and the CPU 221 respectively. When the electric power of the image forming apparatus 100 is supplied, the CPU 201 loads the initialization program of the ROM 202 to the RAM 250. Then, the CPU 201 executes the initialization program in the RAM 250 to deploy main programs for the CPU 201 and the CPU 221 stored in the HDD 104 to the RAM 250. Then, the CPU 201 and the CPU 221 realize a function as the image forming apparatus 100 by executing the programs respectively deployed in the RAM 250. Also, the RAM 250 may be used as a temporary work memory at a time of execution of the initialization program or the main programs.

Note, in the embodiment, although description is given based on the configuration in which the RAM 250 is shared by the CPU 201 and the CPU 221, another configuration in which a dedicated RAM of the CPU 201 and a dedicated RAM of the CPU 221 are arranged separately may be realized. Also, in the embodiment, although a configuration in which the non-volatile memory 203, the USB controller 204, the disk controller 205, and the network controller 206 are controlled by the CPU 201 is described, a configuration may be taken such that some or all of these are controlled by the CPU 221.

FIGS. 3A to 3C depict cross-sectional views for describing a configuration of the printer engine 105 of the image forming apparatus 100 apparatus according to the embodiment. FIG. 3A depicts a cross-sectional view of the entire the image forming apparatus 100, FIG. 3B depicts a cross-sectional view of an image forming unit 303, and FIG. 3C depicts a cross-sectional view magnifying a drum peripheral. Note, the printer engine 105 will be described as a printer engine which can perform color printing by four colors of toner: yellow, magenta, cyan, and black. However, a printer engine that use a one color black toner, or red and blue, or gray toner that can more express a richer color space, or a printer engine that can express a variety of textures on the surface of a print material also using clear toner are also possible.

In the image forming apparatus 100, in addition to the optional cassettes 111 through 113 described above, a paper feed cassette 302 is arranged, and the paper feed cassette 302 and optional cassettes 111 through 113 are similarly handled. Also, a paper feed tray 301 is a paper feed tray for feeding paper by a manual feed. In the printer engine 105, the image forming unit 303 which forms by toner an image onto a paper by an electrophotographic process, a fixing roller 308, and a pressure roller 309 are included, and a fixing unit for fixing toner onto the paper is included. Also, memory tag interfaces 330a through 330d (FIG. 3B) for communicating with a memory tag described later are included. A conveyance path of a paper when being fed from the paper feed cassette 302 or any one of the optional cassettes 111 through 113 is represented by the sequence of P1, P2, and P3 if single sided printing. Also, if double-sided printing, conveyance is in the order P1, P2, and P3, and then conveyance is in the order of P6, P2, and P3 after a switchback of P3, and then discharge to the outside of the device is performed. Reference numeral 304 denotes a discharge tray.

Next, an description will be given regarding a configuration of the image forming unit 303 with reference to FIG. 3B and FIG. 3C.

Toner cartridges 310a through 310d are toner cartridges of yellow, magenta, cyan, and black respectively. Here, a through d correspond to configurations of toner cartridges and transfer rollers and configurations of the memory tag interfaces for yellow, magenta, cyan, and black. Accordingly, in the description below, a configuration corresponding to yellow is described, but because configurations of the other colors can be realized similarly, description relating to configurations of these other colors is omitted.

The toner cartridge 310a has a charger including a charger roller 311a, a developer including a developing roller 313a, a photosensitive drum 312a, a memory tag 314a, and a remaining toner amount sensor 315a. The charger forms an electrostatic latent image on the photosensitive drum 312a based on yellow image data transmitted from the controller board 102, and the developer develops a yellow image on the photosensitive drum 312a. The memory tag 314a stores information of use results of a yellow toner (consumable) of the cartridge 310a. Note, the memory tag 314a can be realized by a flash memory connected by serial communication or even by a microcomputer capable of connecting by short-range wireless communication. In such a case, a write or a read is performed with respect to a flash memory connected to the microcomputer after the microcomputer receives a command.

The yellow image developed on the photosensitive drum 312a is transferred to an intermediate transfer belt 306 by a primary transfer roller 307a. Also, for images of other colors it is similar, and they are overlappingly transferred onto the intermediate transfer belt 306 by each of the corresponding transfer rollers 307b through 307d. In this way, the color image formed on the intermediate transfer belt 306 is transferred to a paper fed from the paper feed cassette or the like by a secondary transfer roller (secondary transfer belt) (not shown).

Note, for the toner cartridges 310a through 310d, respectively an interface with the printer engine 105 for control of printing and an interface with the printer engine 105 for communication with the memory tag may be implemented independently. Alternatively, they may be configured such that indirect communication with the memory tag is possible via an interface with the printer engine 105 for the control of printing.

The remaining toner amount sensor 315a may be realized by a sensor for detecting the remaining amount of yellow toner within the toner cartridge 310a, such as by an optical sensor or an ultrasonic sensor for example. The remaining toner amount sensor 315a may be configured using other various sensors.

Next, description will be given of an overview regarding a control of the printer engine 105 at a time of a print.

The printer engine 105 develops images on the photosensitive drums 313a through 313d based on image data transmitted from the controller board 102 and overlaps and transfers them onto the intermediate transfer belt 306. The printer engine 105 feeds paper from any one of the paper feed cassettes 302 or 111 through 113, and secondary transfers the toner image primary transferred to the intermediate transfer belt 306 to a paper being conveyed through P2 via P1. Then, the printer engine 105 causes toner to be fixed to the surface of the paper by the paper that the toner image was transferred onto being conveyed to a fixing unit which has the fixing roller 308 and the pressure roller 309. Finally, the printer engine 105 discharges the paper onto which the toner image has been fixed to the discharge tray 304 through P3. Also, the printer engine 105 can detect the remaining amount of paper accommodated in each corresponding paper feed cassette by a remaining paper amount sensor arranged in each paper feed cassette.

Figure 4:
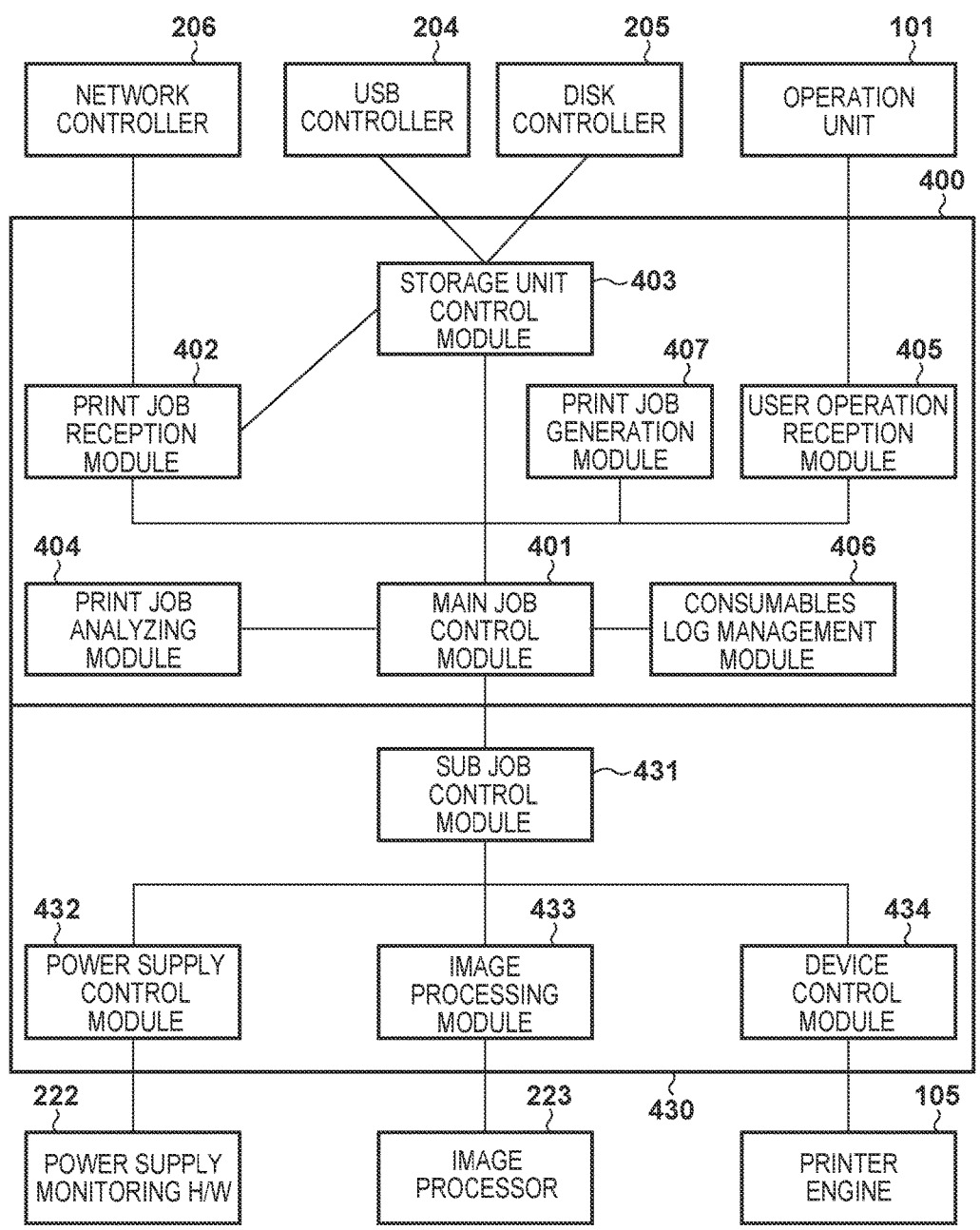
FIG. 4 is a block diagram for describing a configuration of software modules included in respective main programs that a main CPU and a sub-CPU of the image forming apparatus execute according to an embodiment.

FIG. 4 is a block diagram for describing a configuration of software modules included in respective main programs that the main CPU 201 and the sub-CPU 221 of the image forming apparatus 100 execute according to the embodiment. The CPU 201 executes a main program 400 deployed in the RAM 250 and the CPU 221 executes a sub-program 430 deployed in the RAM 250.

The main program 400 includes a main job control module 401, a print job reception module 402, a storage unit control module 403, a print job analyzing module 404, a user operation reception module 405, a consumables log management module 406, and a print job generation module 407. The main job control module 401 controls each software module necessary in order to execute a print job, notifies necessary information to each module, and performs communication with the sub-program 430. The print job reception module 402 receives print jobs from the network controller 206, or the storage unit control module 403 and the print job generation module 407, and stores these in the HDD 104 via the storage unit control module 403. The storage unit control module 403 controls the USB controller 204 and the disk controller 205, and performs control of data transmission/reception with the USB memory 130 and the HDD 104. The print job analyzing module 404 analyzes print jobs to create intermediate data. The user operation reception module 405 accepts settings and the like such as the paper size or the paper type of each paper feed source by a user operation via the operation unit 101. The consumables log management module 406 records use results of a cartridge as consumables log information and a consumables log record described later. The print job generation module 407 generates a print job which prints a consumables log based on the contents of the consumables log information. Note, there may also be a function which generates a job which prints as a report setting information and the like such as the paper size and the paper type of each paper feed source described above.

The sub-program 430 includes a sub job control module 431, a power supply control module 432, an image processing module 433, and a device control module 434. The sub job control module 431 controls each software module necessary in order to execute a print job, notifies necessary information to each module, and performs communication with the main program 400. The power supply control module 432 controls the power supply monitoring H/W 222. The image processing module 433 controls the image processor 223 for generating image data for printing. The device control module 434 controls the printer engine 105 in order to print an image onto a paper in accordance with image data for printing.

Note, in the embodiment, although the sub-program 430 includes the device control module 434, configuration may also be taken such that an additional dedicated CPU is arranged in the printer engine 105 to execute later described processing by communicating with the device control module of the printer engine 105.

FIG. 5 depicts a view for describing transitions of screens displayed on the display unit 124 of the operation unit 101 when a report printing function is executed by the image forming apparatus 100 according to a first embodiment.

When the image forming apparatus 100 is activated, the user operation reception module 405 displays a job waiting screen 500 on the display unit 124. When the user operation reception module 405 detects that the upward button 121 is pressed while the job waiting screen 500 is being displayed, the display of the display unit 124 is caused to transition to a setting menu screen 530. When the user operation reception module 405 detects that the downward button 123 is pressed while the job waiting screen 500 is being displayed, the display of the display unit 124 is caused to transition to a utility screen 510. Furthermore, when the user operation reception module 405 detects that the upward button 121 and the downward button 123 have been alternated ten times while the job waiting screen 500 is being displayed, the display of the display unit 124 is caused to transition to a service mode screen 551.

When starting display of the utility screen 510, a cursor is positioned on "counter confirmation". When the downward button 123 is detected to be pressed in this state, the user operation reception module 405 causes the cursor to transition to the below "consumables confirmation" as illustrated by the utility screen 510. Then, when the user operation reception module 405 detects that the execution button 122 has been pressed in this state, the display of the display unit 124 is caused to transition to a consumables confirmation screen 511. When starting display of the consumables confirmation screen 511, the cursor is positioned at a "consumables log print" position. When the execution button 122 is pressed in this state, transition to a consumables log print screen 512. On the consumables log print screen 512, the cursor is positioned to a "<execute>" line. When the execution button 122 is pressed in this state, the user operation reception module 405 makes an instruction for an execution of the consumables log print to the print job generation module 407 and transitions to an "executed" screen 513. At that time, the print job generation module 407 generates a print job of the consumables log print, and when the print job analyzing module 404 starts analyzing the print job of the consumables log print, the user operation reception module 405 causes the display of the display unit 124 to transition to a "printing" screen 521. Then, the print job analyzing module 404 completes analysis of the print job of the consumables log print, and the device control module 434 ends printing of the consumables log by controlling the printer engine 105. Because of this, the user operation reception module 405 causes the display of the display unit 124 to transition to the consumables log print screen 512.

Also, when starting display of the service mode screen 551, the cursor is positioned at "consumables log (details)". When the execution button 122 is pressed in this state, the user operation reception module 405 causes the display of the display unit 124 to transition to a consumables log (details) screen 552. When the consumables log (details) screen 552 is displayed, the cursor is positioned at an "<execute>" line. When the execution button 122 is pressed in this state, the user operation reception module 405 makes an instruction for an execution of the consumables log print (details) to the print job generation module 407 and transitions to an "executed" screen 533. Because of this, the print job generation module 407 generates a print job of the consumables log (details) print, and the print job analyzing module 404 starts analyzing the print job of the consumables log (details) print. Then the user operation reception module 405 causes display of the display unit 124 to transition to a "printing" screen 554. Then, the print job analyzing module 404 completes analysis of the print job of the consumables log (details) print, and the device control module 434 ends printing of the consumables log (details) by controlling the printer engine 105. With this, the user operation reception module 405 causes the display of the display unit 124 to transition to the consumables log (details) screen 552.

Note, because the transitions of these screens illustrate only one example, a different menu hierarchy, or displayed messages or language, images that configure the screens and the like are irrelevant to the fundamental problem of the invention, and any configuration may be applied as appropriate. For example, consumable items for which the consumables log print function can be executed may also be included in the service mode screen 551.

FIGS. 6A-6C depict views for describing an example of a print of consumables logs by the image forming apparatus 100 according to the embodiment. In the embodiment, as previously described, there are examples of printing of consumables logs of two types: a consumables log print and a consumables log (details) print. Note, the examples of printing consumables log is only examples, and for example, it also possible to print just one of the types, or to print three or more types of logs.

FIG. 6A depicts a view illustrating an example of a simplified version of a consumables log by an instruction of a general user and illustrating an example of a print of a cartridge replacement log. FIG. 6B depicts a view illustrating an example of a detailed version of a consumables log (details) printed by an instruction of a serviceman and illustrating an example of a print of a cartridge replacement log. Note, an example of having printed a consumables log of each cartridge Y, M, C, and K within one page is illustrated because an example of a print by the image forming apparatus 100 to which toner cartridges of a plurality of colors can be attached is illustrated. In contrast to this, in a case of an image forming apparatus of a monochrome engine, only the consumables log information of the K cartridge is printed to one page. Also, a layout assigning one page to each color or the like may be used.

In this consumables log print, two columns are printed in order to save paper because the amount of information corresponding to one record is suppressed. FIG. 6C depicts a view illustrating an example of the consumables log print. In FIG. 6C, from the left, serial numbers of the cartridges, sizes of the cartridges, usage start information, latest usage information, and type information of the cartridges are included. The date/time, the page count which is cumulative sheet count of pages that the cartridge was used to print, and the remaining amount of toner are included in the usage start information and the latest usage information.

Here, the serial number of a cartridge is a number of a particular cartridge represented by an eight digit integer value. In the size information of a cartridge, "starter" represents a starter cartridge, "standard" represents a standard size cartridge, "large" represents a large capacity cartridge, and "unknown" represents that it is a cartridge for which the capacity size is unknown. The remaining amount of a cartridge is a result calculated based on the life span of the developer, the photosensitive drum, and the remaining amount of toner of the cartridge, and 100% represents a new product, and 0% represents that the life span reached non-usability. For the type of a cartridge, "genuine" represents a genuine cartridge, "OEM" represents an original equipment manufacturer (OEM) cartridge, "tagless" represents a tagless cartridge, and "copy tag" represents a copy tag cartridge.

In the consumables log (details) print, the amount of information corresponding to one record is large so it is printed in one column. FIG. 6D depicts a view illustrating an example of the consumables log (details) print. Here, in relation to the usage start information and the latest usage information, in addition to FIG. 6C, the life span and the remaining amount information of the toner, the photosensitive drum, and the developer respectively are further printed.

Figure 7:
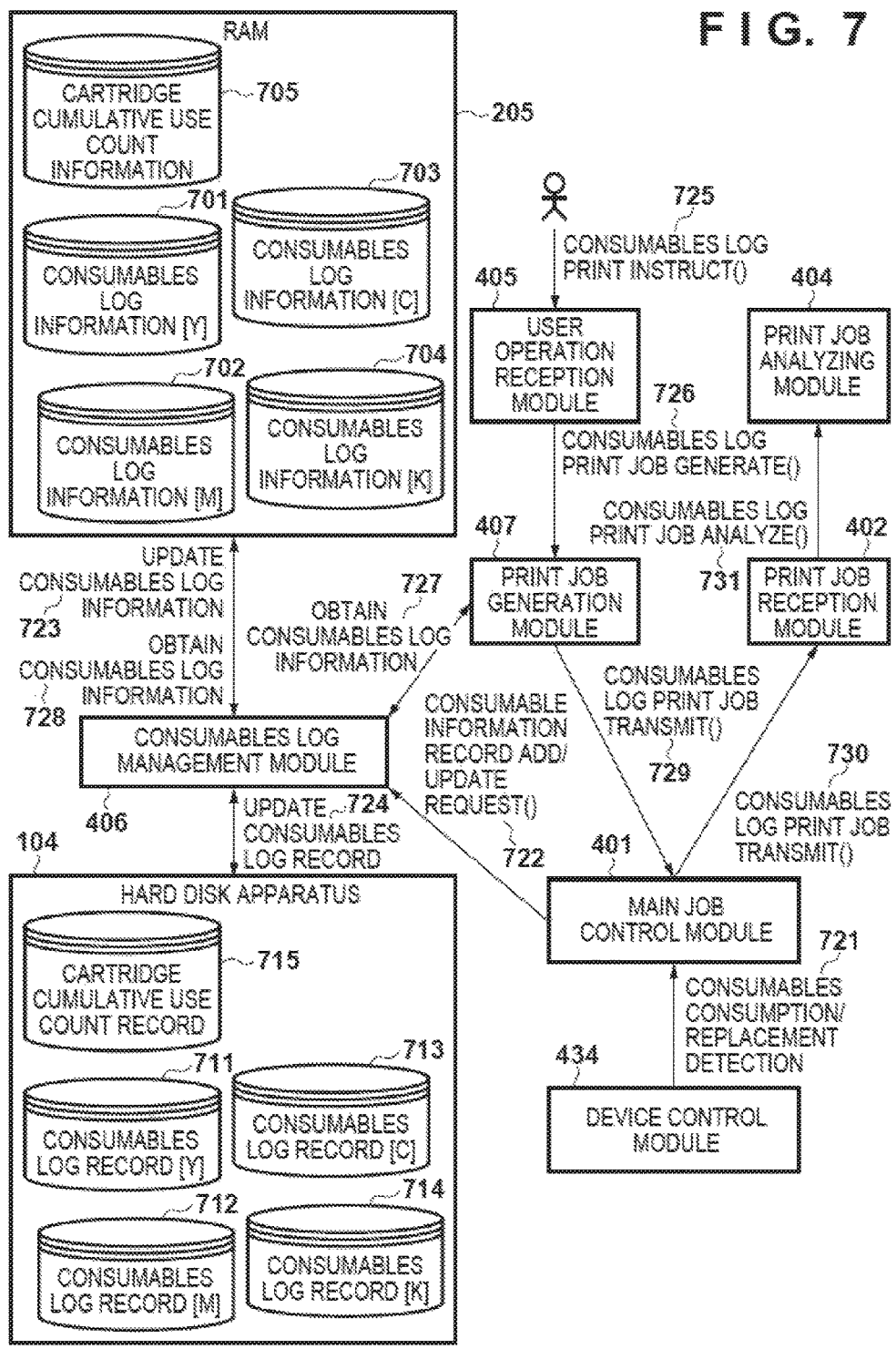
FIG. 7 depicts a view illustrating an exemplification of a relationship of consumables log functions in the image forming apparatus according to the embodiment.

FIG. 7 depicts a view illustrating an exemplification of a relationship of consumables log functions in the image forming apparatus 100 according to the embodiment.

Firstly, a flow of a consumables log update will be described. Print processing based on a print instruction from the print job analyzing module 404 is performed. At that time in reference numeral 721, a consumption detection of a consumable or a replacement detection of a consumable from the device control module 434 is made. By this, in reference numeral 722, the main job control module 401 makes a notification of a request for an addition or update of a consumables log information record to the consumables log management module 406. Then in reference numeral 723, the consumables log management module 406 adds or updates the record of consumables log information 701 through 704 of the RAM 250. At the same time, a cumulative use count of a cartridge in which an error tag is provided or a cumulative use count of a tagless cartridge is recorded or updated to cartridge cumulative use count information 705. Also the consumables log management module 406 in reference numeral 724 adds or updates records of consumables log records 711 through 714 of the HDD 104. Here, simultaneously, a cumulative use count of a cartridge in which an error tag is provided or a cumulative use count of a tagless cartridge is recorded to a cartridge cumulative use count record 715 or updated.

The consumables log information 701 through 704 and the cartridge cumulative use count information 705 are held in the RAM 250, and while high speed access is possible, information is lost at a time of a power off. Meanwhile, because the consumables log records 711 through 714 and the cartridge cumulative use count record 715 are held in the HDD 104, while they are held even during a power off state, access speed is slow. The consumables log management module 406 is caused to achieve both holding of information in a power off state and access speed by using and these two types of storage apparatuses for storage in this way. Note, although information is held in the HDD 104 here, it may be held to the non-volatile memory 203 for example. Furthermore, in such a case, by using the RAM 250 as a cache memory, there is the effect that it is possible to suppress the number of writes of the non-volatile memory 203.

Next, a flow of a consumables log print execution will be described. In reference numeral 725, when the user operation reception module 405 receives a print instruction for a consumables log from a user, the user operation reception module 405 makes an instruction for a generation of a print job for a consumables log print to the print job generation module 407 in reference numeral 726. By this, in reference numeral 727, the print job generation module 407 makes a request for an obtainment of the consumables log information to the consumables log management module 406. By this, in reference numeral 728, the consumables log management module 406 obtains the consumables log information 701 through 704 in the RAM 250 and makes a notification of it to the print job generation module 407. By this, the print job generation module 407 generates the print job, and transmits it as a consumables log print job to the main job control module 401 in reference numeral 729. In this way, in reference numeral 730, the main job control module 401 makes a notification to the print job reception module 402 that a new print job has come. Then, in reference numeral 731, the print job reception module 402 makes an instruction for processing for analysis of the consumables log print job to the print job analyzing module 404. Hereinafter, description will be omitted of the print processing because it is the same as the case of a normal print job.

In this way, centered around the print job generation module 407, print processing and generation of a print job for a consumables log print are performed based on the print instruction from the user.

Figure 8A:
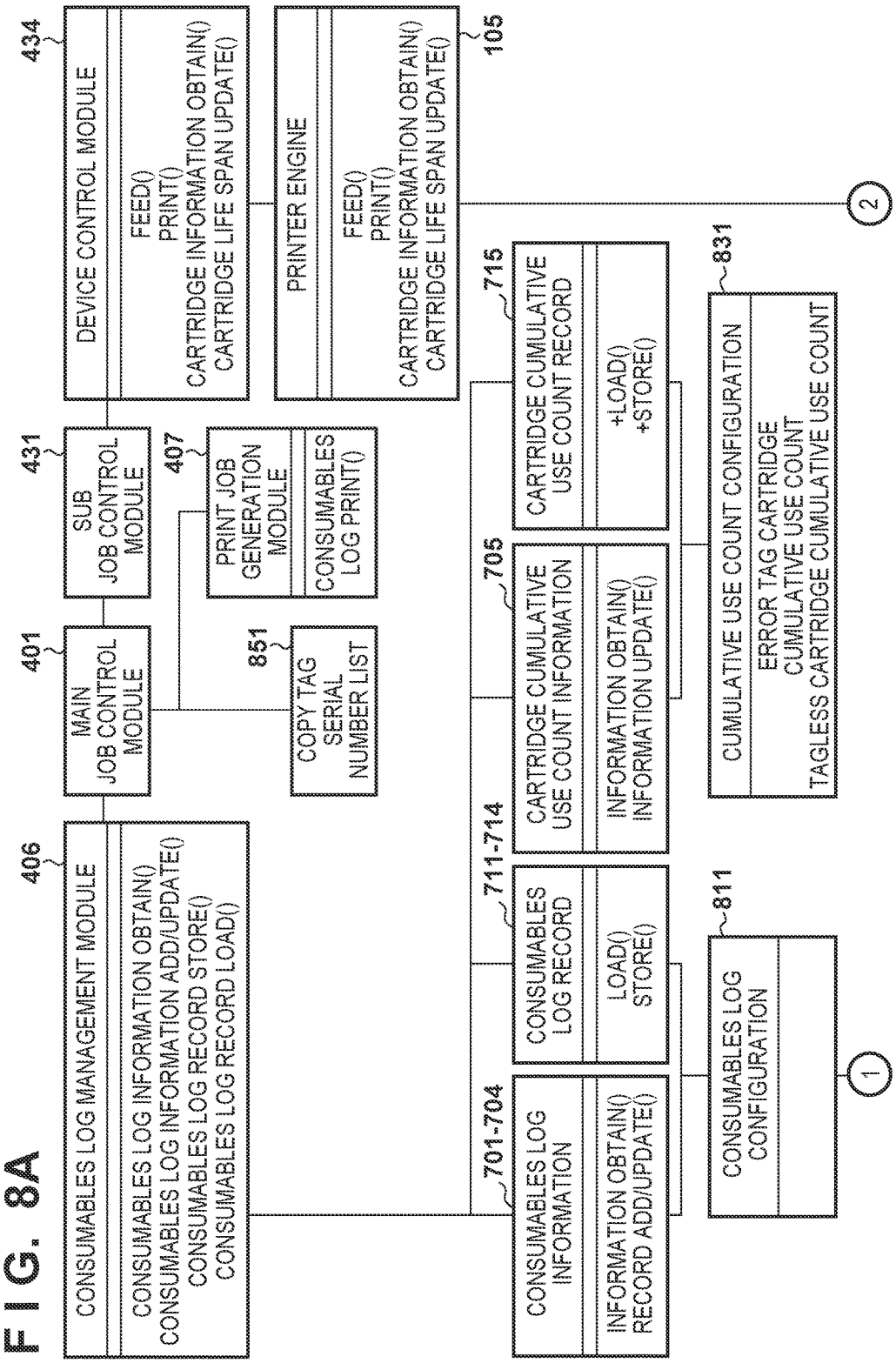
FIGS. 8A and 8B depict views for describing classes of the consumables log functions of the image forming apparatus according to the embodiment.
Figure 8B:
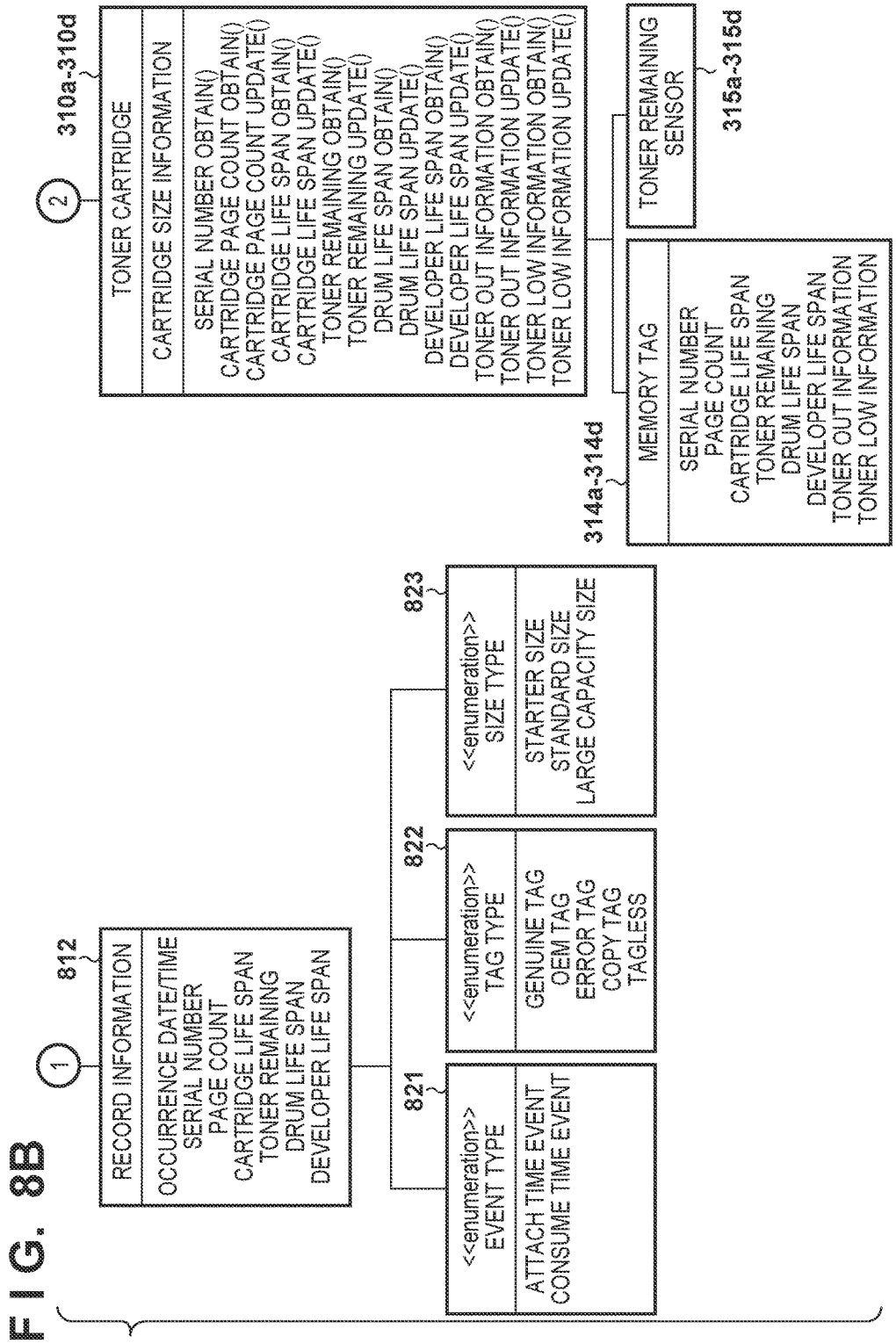

FIGS. 8A and 8B depict views for describing classes of the consumables log functions of the image forming apparatus 100 according to the embodiment. In FIGS. 8A and 8B, portions common to the previously described figures are indicated by the same reference numerals.

The main job control module 401 has a copy tag serial number list 851. The copy tag serial number list 851 is a list of serial numbers of copy tags distributed in the market, and may be static information or may also be information which can be updated dynamically. In the present embodiment, a copy tag is treated as something that is attached to a cartridge holding a serial number described in the list even if it is a cartridge for which reading of information from a memory tag is possible, and there is no contradiction in the remaining amount of toner information and no trace of a refill.

The consumables log management module 406 includes an obtainment function for consumables log information, an addition/update function for consumables log information, and a function for performing a storage and a load of a consumables log record. Also, the consumables log management module 406 holds the consumables log information 701 through 704 and the consumables log records 711 through 714, the cartridge cumulative use count information 705, and the cartridge cumulative use count record 715. The consumables log information 701 through 704 and the consumables log records 711 through 714 inherits a consumables log configuration 811. The consumables log information 701 through 704 includes a function which obtains consumables log information and a function which adds and updates a record. Also, the consumables log records 711 through 714 load from the HDD 104 information relating to the consumables log and have a function which stores them in the HDD 104. By this, the information held in the consumables log records 711 through 714 is restored to the consumables log information 701 through 704, or the information held in the consumables log information 701 through 704 can be recorded as the consumables log records 711 through 714.

The consumables log configuration 811 is a class which manages shared information in the consumables log information 701 through 704 and the consumables log records 711 through 714, and has a plurality of items of record information 812. Single record information, has information of an occurrence date/time, a serial number of a cartridge, and a page count indicating a cumulative number of printed sheets of the cartridge. Furthermore, the record information has information of the life span of a cartridge, the remaining amount of toner, the life span of a photosensitive drum, the life span of a developer, and the like. Furthermore, it has an event type 821 at a time the record was added, a tag type 822 which expresses the type of memory tag provided, and a size type 823 which indicates the size of the cartridge. The event type 821 indicates whether the record was added at a time of attaching the cartridge or whether the record was added at a time of consumption. The tag type 822 includes any one of the items: a genuine tag, an OEM tag, an error tag, a copy tag, and tagless. Here, the genuine tag indicates a memory tag attached to a cartridge supplied by the manufacturer of the image forming apparatus. The OEM tag indicates a memory tag attached to a cartridge supplied by another manufacturer that sells as an OEM. The error tag indicates a memory tag for which a contradiction arose between toner remaining amount information and non-usability information (out of toner information). Tagless indicates a case in which a tag is not attached to the cartridge. Also, the copy tag is a special memory tag which indicates a tag created by copying information held in a genuine memory tag or an OEM tag. In the embodiment, information necessary for an investigation can be reliably obtained by identifying these to collect the information. The size type 823 indicates whether the cartridge is a starter size, a standard size, or a large capacity size. The classifications of cartridges described above are just one example and there may be further different information.

The cartridge cumulative use count information 705 and the cartridge cumulative use count record 715 inherit a cumulative use count configuration 831. The cartridge cumulative use count information 705 includes functions for obtaining and updating a cumulative use count of each cartridge. The cartridge cumulative use count record 715 has functions for loading from the HDD 104 information relating to the cartridge cumulative use count and for storing in the HDD 104. By this, the cartridge cumulative use count information 705 can be recorded in the cartridge cumulative use count record 715 and information relating to the cumulative use count of the cartridge cumulative use count record 715 can be recovered to the cartridge cumulative use count information 705. The cumulative use count configuration 831 is a class for managing a cumulative use count of a cartridge used in the image forming apparatus 100. In the embodiment, the number of times an error tag cartridge was used and the number of times a tagless cartridge was used are recorded.

The device control module 434 in addition to a functions for feeding and printing, has a function for obtaining information of a cartridge. In addition, although processing which updates the remaining amount and the life span of each consumable material included in a cartridge is performed based on the print conditions when printing, such details are omitted.

The printer engine 105 executes feeding, printing, and the like in accordance with instructions from the device control module 434. It also has a function for updating life span, remaining amount, and the like and for obtaining cartridge information. Each of the toner cartridges 310a through 310d has cartridge size information. Specifically, the toner cartridge has information as to whether the cartridge is a starter size, a standard size, or a large capacity size. Note, for example, the cartridge size can be represented by the number of printable sheets, or can be represented in the form of the consumable amount. Also, each of the toner cartridges 310a through 310d has a function for obtaining a serial number. There are also functions for updating and obtaining the life span and remaining amount of parts such as the cartridge main body, toner, a photosensitive drum, and a developer, and the page count which is the cumulative number of printed sheets. There is also a function for updating and obtaining flags which indicate whether out of toner or low toner (the toner amount is a predetermined amount or less) has occurred. Here, out of toner represents that a flag is turned on in a case when the remaining amount of the consumable in the cartridge becomes "0", and indicates a print cannot be continued by the cartridge. Low toner represents that a flag is turned on in a case when the remaining amount of the consumable becomes less than a fixed amount, and indicates that preparation for a replacement is necessary for the cartridge. Also, the toner cartridges 310a through 310d respectively have the memory tags 314a through 314d. The memory tags 314a through 314d hold information indicating the serial number of the toner cartridge, the page count which is the cumulative number of printed sheets, the life span of the cartridge, and a life span and a remaining amount of the toner, the photosensitive drum, and the developer. Also, there is low toner information and toner out information. Also, the toner cartridges 310a through 310d respectively have the remaining toner amount sensors 315a-315d.

FIGS. 9A-9D depict views representing, as schematic diagrams, formats of information held in the HDD 104 of the image forming apparatus 100 according to the embodiment.

A header portion including the cartridge cumulative use count record 715 and a body portion including the consumables log records 711 through 714 are included.

FIG. 9A illustrates the header portion, and the header portion has a magic number 901, a data number 902 of each color of cartridge, and a cumulative use count record 903. The magic number 901 is information for determining whether the information is correctly stored. It is determined as un-initialized in a case in which information that does not correspond to this is recorded. Also, by including version information in the magic number 901, it may be used as information which distinguishes whether information of a previous version is recorded or whether the information of the new version is recorded in a case of performing a future function enhancement. Here, a character sequence such as simply "CRG-LOG" is held as the magic number.

The data number 902 of each color of cartridge included in the header portion is a number of the record information 812 of the four colors: yellow, magenta, cyan, and black. Also, the cumulative use count record 903 holds an accumulation of the number of times an error tag cartridge was used and an accumulation of the number of times a tagless cartridge was used in the image forming apparatus 100. The other areas are reserved areas.

FIG. 9B illustrates the body portion, and is represented by an array of records indicating the record information 812. A record includes event type information of the record, the life span of the cartridge (the remaining amount), the remaining amount of toner, the life span of the photosensitive drum, and the life span of the developer. Also the record includes date/time information for when the record was added, tag type information, size information, page count information of the cartridge, and serial number information of the cartridge. Note, in the description hereinafter, description will be given using a notation such that the head of the array is the 0th byte according to the method of representing used in programming. Also, using the prefix such as "0x" indicates the hexadecimal notation.

An uppermost 1 bit of the head 0x0 byte of a record is the event type information. Event type information represents information for a time of attaching if "0x0" and information for a time of consumption if "0x1". The 2nd-7th bits of the 0x0-0x3 bytes from the head of the record are each type of life span and remaining amount information. The 0th byte indicates the life span of the cartridge. The 1st byte indicates the remaining amount of toner, the 2nd byte indicates the life span of a photosensitive drum, and the 3rd byte indicates the life span of a developer. These life spans and remaining amounts are life span and remaining amount information obtained from the toner cartridges 310a through 310d, and are represented by value ranges of 0-100 in percent units. The head 0x4-0x7 bytes of the record are date/time information. Here this is expressed by seconds elapsed since Jan. 1, 1970. The high order 4 bits of the 0x8 byte from the head express the tag type. For the tag type, "0x0" indicates a genuine product cartridge, "0x1" indicates an OEM cartridge, "0x7" indicates an error tag cartridge, "0x8" indicates a copy tag cartridge, and "0xf" indicates a tagless cartridge. The low order 4 bits of the 0x8 byte from the head indicate the size type. For the size type, "0" indicates a standard size cartridge, "1" indicates a starter cartridge, and "2" indicates a large capacity cartridge. Additionally, the 0x9-0xB bytes from the head indicate the page count information of the cartridge. Additionally, the 0xC-0xF bytes from the head indicate the serial number of the cartridge. These are values obtained from the toner cartridges 310a through 310d.

FIGS. 9C and 9D depict views illustrating examples of specific arrangements in the HDD 104 of the above described information.

In FIG. 9C, a color image forming apparatus is assumed, and FIG. 9C indicates an example in which a header portion, 400 records each for records of a yellow cartridge, records of a magenta cartridge, records of a cyan cartridge, and records of a black cartridge in order are stored. In FIG. 9D, a monochrome image forming apparatus is assumed and FIG. 9D depicts a view illustrating an example in which 1600 records of a black cartridge and a header portion are stored.

These examples merely illustrate examples of realized configurations, and optional formats of data or permutations of each cartridge can be used. For example, encryption or scrambling may be performed, to hold in a form that a general user cannot view as is, or a configuration that holds compressed information may be used. Also, as with the embodiment, a form in which, instead of enabling understanding of data size in advance by including data number in the header information, a data count is held in the head of the record portion of each cartridge without including the data number in the header information may be used.

Also, although the remaining amount of toner, the life span of the photosensitive drum, and the life span of the developer are represented in percentages, they may be represented and stored in different unit types such as remaining page numbers. Also, besides using 32 bit integers as the serial number of a cartridge, holding may be as a character sequence or the like.

Note, in the embodiment, an example in which this information held in a storage area of the main body of the image forming apparatus is described. However, limitation is not made to this, for example, configuration may be taken so as to hold this information on a server on the Internet or to record it to dedicated hardware connected to the image forming apparatus main body.

First Embodiment

Hereinafter, a first embodiment of the present invention will be described.

Firstly, a serial number which is identification information of a cartridge is added to every cartridge as the premise. Note, the serial number may be a character sequence including alphabet or numerals for example, rather than being limited to a decimal number numeric value. Conventionally, a new cartridge is determined to be attached on an occasion in which the cartridge serial number read from the cartridge changes. In the first embodiment, in addition to this, even in a case in which reading of the serial number of a cartridge fails, obtainment of the serial number of the cartridge is attempted until the cartridge is removed the next time. So, there is a feature in that when obtainment of the serial number of the cartridge succeeds, the cartridge is handled as something for which obtainment of the serial number succeeded from a point in time at which the reading of the serial number failed. Also, there is a feature in the point that, in the case where reading of the serial number succeeded, until the cartridge is removed the next time, a new cartridge is not considered to have been attached even though obtainment of the serial number of the cartridge fails.

Hereinafter, description will be given for specific effects according to the first embodiment with reference to FIGS. 10A and 10B.

FIGS. 10A and 10B depict views illustrating an example of transitions of the consumables log information according to the first embodiment, and FIG. 10A indicates results of a conventional technique and FIG. 10B indicates results of applying the first embodiment. Hereinafter, description is given for a case in which a cartridge for which the serial number is "1" is attached and a cartridge for which the serial number is "2" is attached after a consumption detection is made twice under the same conditions describing the first embodiment above. Firstly, description is given regarding behavior in a case when the conventional technique is used with reference to FIG. 10A.

Reference numeral 1001 denotes a case in which obtainment of information from cartridges does not fail even once as a normal case. Reference numeral 1002 denotes records at this time, and when it is detected that a cartridge of serial number "1" is attached at this time, a record relating to the attachment of the cartridge of the serial number "1" is recorded. Also, when it is detected that the cartridge of the serial number "1" is consumed, a record relating to the consumption of the cartridge of the serial number "1" is recorded. Additionally, when it is detected that the cartridge of the serial number "1" is consumed again, the previous record is overwritten. Also, when it is detected that a cartridge of the serial number "2" is attached, a record relating to the attachment of the cartridge of the serial number "2" is recorded.

Next, a description will be given for a case when obtainment of information of a cartridge fails at a time of cartridge attachment.

Reference numeral 1011 denotes a case when a read error of cartridge information occurs at a time of cartridge attachment. At that time, a cartridge whose serial number is unknown is attached, and in reference numeral 1012, a record relating to the attachment of the cartridge whose serial number is unknown is recorded. Also, when it is detected that a cartridge of the serial number "1" is consumed, a record relating to the attachment of the cartridge of the serial number "1" and a record relating to consumption are recorded in reference numeral 1012. Additionally, when it is detected that the cartridge of the serial number "1" is consumed again, the previous record regarding consumption is overwritten in reference numeral 1012. Also, when it is detected that a cartridge of the serial number "2" is attached, a record relating to the attachment of the cartridge of the serial number "2" is recorded.

Next, a description will be given for a case when obtainment of information of a cartridge fails when toner consumption of the cartridge occurs at the first time.

Reference numeral 1021 denotes a case when a read error of cartridge information occurs at a time of detection of toner consumption of a cartridge for the first time. Also, when it is detected that a cartridge of the serial number "1" is attached, a record relating to the attachment of the cartridge of the serial number "1" is recorded in reference numeral 1022. Next, when it is detected that the toner of a cartridge whose serial number is unknown is consumed, a record relating to the attachment of the cartridge whose serial number is unknown and a record relating to the consumption is recorded. When next it is detected that toner of the cartridge of the serial number "1" is consumed, a record relating to the attachment of the cartridge of the serial number "1" and a record relating to the consumption are recorded in reference numeral 1022. Then, when it is detected that a cartridge of the serial number "2" is attached, a record relating to the attachment of the cartridge of the serial number "2" is recorded.

Next, a description will be given for a case in which obtainment of cartridge information upon consumption the next time fails in a consumption of the cartridge.

Reference numeral 1031 denotes a case when an obtainment error of cartridge information occurs at a second time of toner consumption of a cartridge. Firstly, when it is detected that a cartridge of the serial number "1" is attached, a record relating to the attachment of the cartridge of the serial number "1" is recorded in reference numeral 1032. Also, when it is detected that the toner of the cartridge of the serial number "1" is consumed, a record relating to toner consumption of the cartridge of the serial number "1" is recorded. Next, when a toner consumption of a cartridge whose serial number is unknown is detected, a record relating to the attachment of the cartridge whose serial number is unknown and a record relating to toner consumption therefor are recorded in reference numeral 1032. Then, when it is detected that a cartridge of the serial number "2" is attached, a record relating to the attachment of the cartridge of the serial number "2" is recorded.

In this way, conventionally, a cartridge is determined based on only the information obtained from the cartridge. Accordingly, it is determined that a new cartridge is attached when obtainment of information of a cartridge succeeds after obtainment of the information of a cartridge failed. Accordingly, a new record of a cartridge whose serial number is unknown is added when obtainment of the information of the cartridge fails. As a consequence, is there a problem in that unnecessary records are generated every time a read error of the cartridge information occurs and that memory area is occupied by unnecessary information.

Next, description will be given for the case of the first embodiment with reference to FIG. 10B.

Reference numerals 1051 and 1052 denote a case in which obtainment of information from a cartridge does not fail even once as a normal case. Description is omitted because this is the same as the case of reference numerals 1001 and 1002 of FIG. 10A.

Next, a description will be given for a case when obtainment of cartridge information fails at a time of cartridge attachment. Reference numeral 1061 denotes a case when a read error occurs at a time of cartridge attachment. At that time, it is detected that a cartridge whose serial number is unknown is attached, and in reference numeral 1062, a record relating to the attachment of the cartridge whose serial number is unknown is recorded. Next, when it is detected that toner of a cartridge whose serial number is "1" is consumed, the foregoing record relating to attachment of the cartridge whose serial number is unknown is overwritten by a record relating to the attachment of the cartridge whose serial number is "1" in reference numeral 1062. Furthermore, the record relating to the consumption of the cartridge of the serial number "1" is recorded. Next, when it is detected that toner of the cartridge of the serial number "1" is consumed again, the previous record regarding consumption is overwritten. Then, when it is detected that a cartridge of the serial number "2" is attached, a record relating to the attachment of the cartridge of the serial number "2" is recorded.

In this way, if obtainment of cartridge information of a cartridge fails when the cartridge is attached, a record relating to the attachment of the cartridge whose serial number is unknown is not created, and the record is recorded as a record of the serial number of the cartridge when toner consumption of the cartridge is next detected.

Next, a description will be given for a case when obtainment of cartridge information of a cartridge fails when toner consumption of the cartridge occurs at the first time. Reference numeral 1071 denotes a case when an obtainment error of the cartridge information occurs at a first time of toner consumption detection for a cartridge. Firstly, when it is detected that a cartridge of the serial number "1" is attached, a record relating to the attachment of the cartridge of the serial number "1" is recorded in reference numeral 1072. Next, in a case when it is detected that toner of a cartridge whose serial number is unknown is consumed, a change of a record is not performed because the cartridge whose serial number is unknown is not attached. Then, when it is detected that toner of the cartridge of the serial number "1" is consumed, a record relating to the attachment of the cartridge of serial number "1" and a record relating to the consumption of the cartridge are recorded in reference numeral 1072. Then, when it is detected that a cartridge of the serial number "2" is attached, a record relating to the attachment of the cartridge of the serial number "2" is recorded.

In this way, a change of the record is not performed in a case in which obtainment of the cartridge information of a cartridge fails at the first time of the toner consumption detection. By this, only the consumption of a cartridge whose serial number is identified is updated.

Next, a description will be given for a case when obtainment of cartridge information of a cartridge fails at the second time of toner consumption detection of the cartridge. Reference numeral 1081 denotes a case when a read error of cartridge information occurs at a second time of toner consumption detection of a cartridge. Firstly, when it is detected that a cartridge of the serial number "1" is attached, a record relating to the attachment of the cartridge of the serial number "1" is recorded. Next, when the consumption of the toner of the cartridge of the serial number "1" is detected, a record relating to the consumption of the cartridge of the serial number "1" is recorded in reference numeral 1082. Next, when it is detected that a toner consumption of a cartridge whose serial number is unknown occurs, an update of a record is not performed because a cartridge whose serial number is unknown is not attached. Then, when it is detected that a cartridge of the serial number "2" is attached, a record relating to the attachment of the cartridge of the serial number "2" is recorded in reference numeral 1082.

In such a case, a change of the record is not performed in a case in when obtainment of cartridge information fails at the second time of the toner consumption. By this, only the consumption of a cartridge whose serial number is identified is updated.

Note, at a time of detection of the toner consumption of a cartridge, the serial number of a cartridge is read a plurality of times and a record relating to the toner consumption of the cartridge is not updated while failure continues. Also, when obtainment of the cartridge information succeeds, the information up until that point is overwritten by the cartridge information of the cartridge for which the obtainment succeeded. Also, a case in which obtainment of the serial number of a cartridge fails at a time of an attachment of the cartridge, and obtainment of the serial number of the cartridge fails at a time of a next detection of the toner consumption of the cartridge can be considered. In such a case, when obtainment of cartridge information of a cartridge succeeds, a record of the serial number of the cartridge for which obtainment succeeded is created and information relating to the toner consumption of the cartridge is recorded in the created record.

By the first embodiment, a record can be supplemented by information of when obtainment of the serial number of a cartridge succeeds rather than creating a new record if obtainment of the serial number of the cartridge fails, from when the cartridge is attached to when it is detached. In other words, it is possible to avoid a creation and addition of unnecessary record as consumables log information due to an incidental read failure of cartridge information of a cartridge.

Next, a description will be given for the first embodiment of the present invention with reference to FIG. 11 through FIG. 17B.

Figure 11:
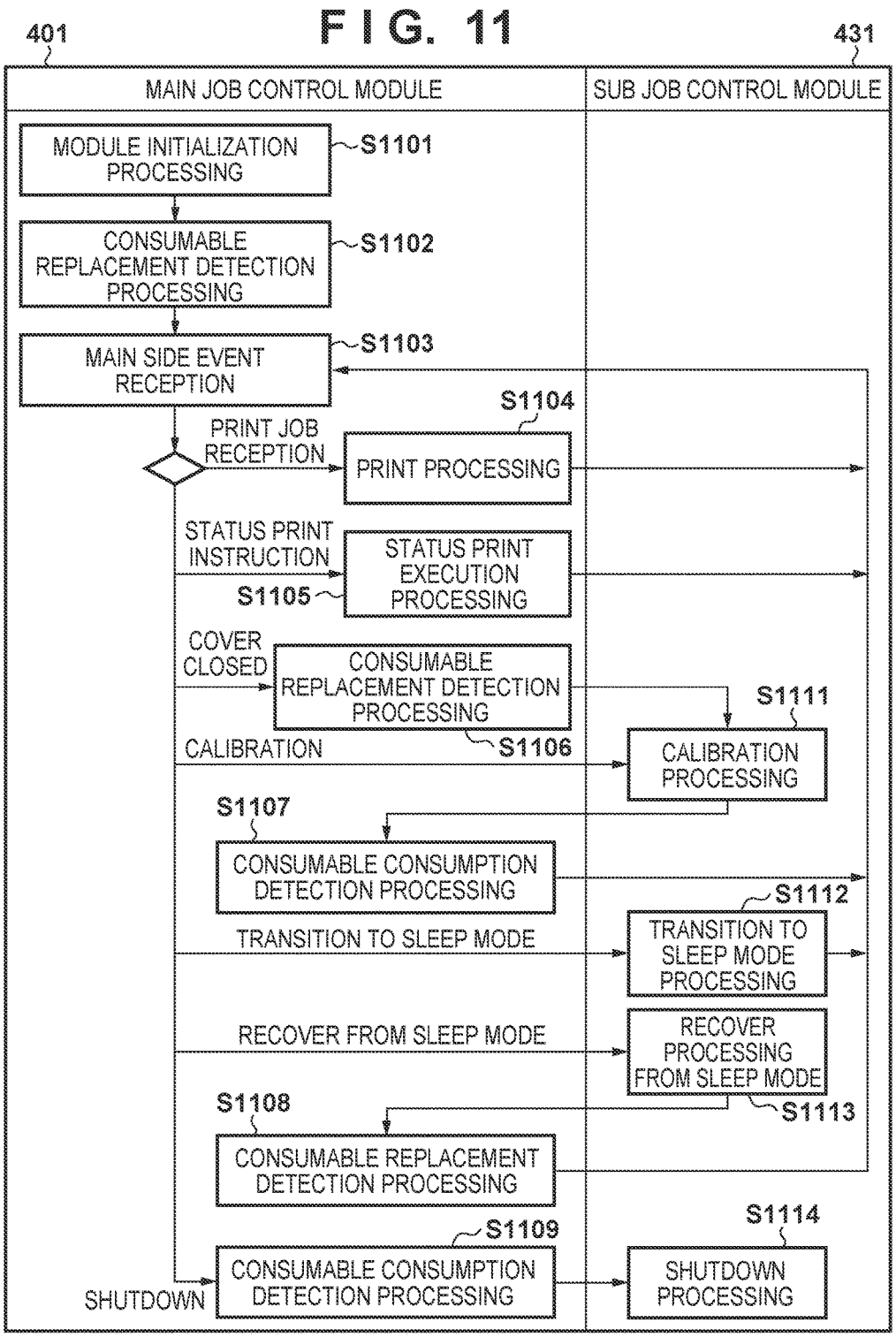
FIG. 11 is a flowchart for describing event reception processing in the image forming apparatus according to the first embodiment.

FIG. 11 is a flowchart for describing event reception processing in the image forming apparatus 100 according to the first embodiment. Note, in the flowchart hereinafter, processing by modules (each module) included in the main program 400 is achieved by the CPU 201 deploying a program installed in the HDD 104 to the RAM 250 and by the CPU 201 executing the program. Also, the processing by the modules (each module) included in the sub-program 430 is achieved by the CPU 221 executing the program deployed from the HDD 104 to the RAM 250. Note that actually, although the main job control module 401 can perform processing other than event processing, description is limited to only major points because description is complicated.

Firstly, the CPU 201 in step S1101 functions as the main job control module 401 and performs an initialization process of each type of module. Next, the processing proceeds to step S1102 and the CPU 201 functions as the main job control module 401, performs processing of a detection of a replacement of a consumable described later, and detects whether a replacement of the consumable has been performed during a power off state.

Next, the processing proceeds to step S1103, and the CPU 201 functions as the main job control module 401 and waits for a new event to occur. This wait to accept an event may be realized by polling or the like in addition to being realized by using a message queue mechanism. Here, when an occurrence of any event is detected, the processing below is proceeded to.

Firstly, the CPU 201 proceeds to step S1104 when it detects an event in which a print job is received, executes the print processing, and then returns to step S1103. Also, the CPU 201 proceeds to step S1105 when it detects a status print instruction event, executes the status print processing, and then advances to step S1103. Also, the CPU 201 proceeds to step S1106 when it detects a cover closed event which indicates that a cover of the main body of the image forming apparatus 100 is closed and executes processing in which it detects a replacement of a consumable. Then, the CPU 201 makes a notification of a start of a calibration to the CPU 221. By this, the CPU 221 functions as the sub job control module 431 and executes calibration processing in step S1111. When the calibration processing ends, the CPU 221 makes a notification of the end of the calibration processing to the CPU 201. By this, the CPU 201 proceeds to step S1103 after executing consumable consumption detection processing in step S1107.

Also, the CPU 201 makes a notification to the CPU 221 so that it transitions to a sleep mode (power saving mode) when it detects a transition event to the sleep mode. By this, the CPU 221 executes processing for transitioning to the sleep mode in step S1112.

Also, the CPU 201 makes a notification to the CPU 221 so that it recovers from the sleep mode when it detects an event for recovering from the sleep mode. By this, the CPU 221 executes processing for recovering from the sleep mode in step S1113. Then, the CPU 221 makes a notification to the CPU 201 that the processing for recovering from the sleep mode has completed when the processing for recovering from the sleep mode ends. By this, the CPU 201 advances the processing to step S1103 after executing processing to detect whether or not a consumable was replaced in step S1108.

Also, the CPU 201 advances the processing to step S1109 when it detects an event for power off of the image forming apparatus 100, and performs processing in which it detects a consumption of the consumable. Also, the CPU 201 makes a notification to the CPU 221 that a power off occurred. By this, the CPU 221 executes shutdown processing in step S1114.

Figure 12:
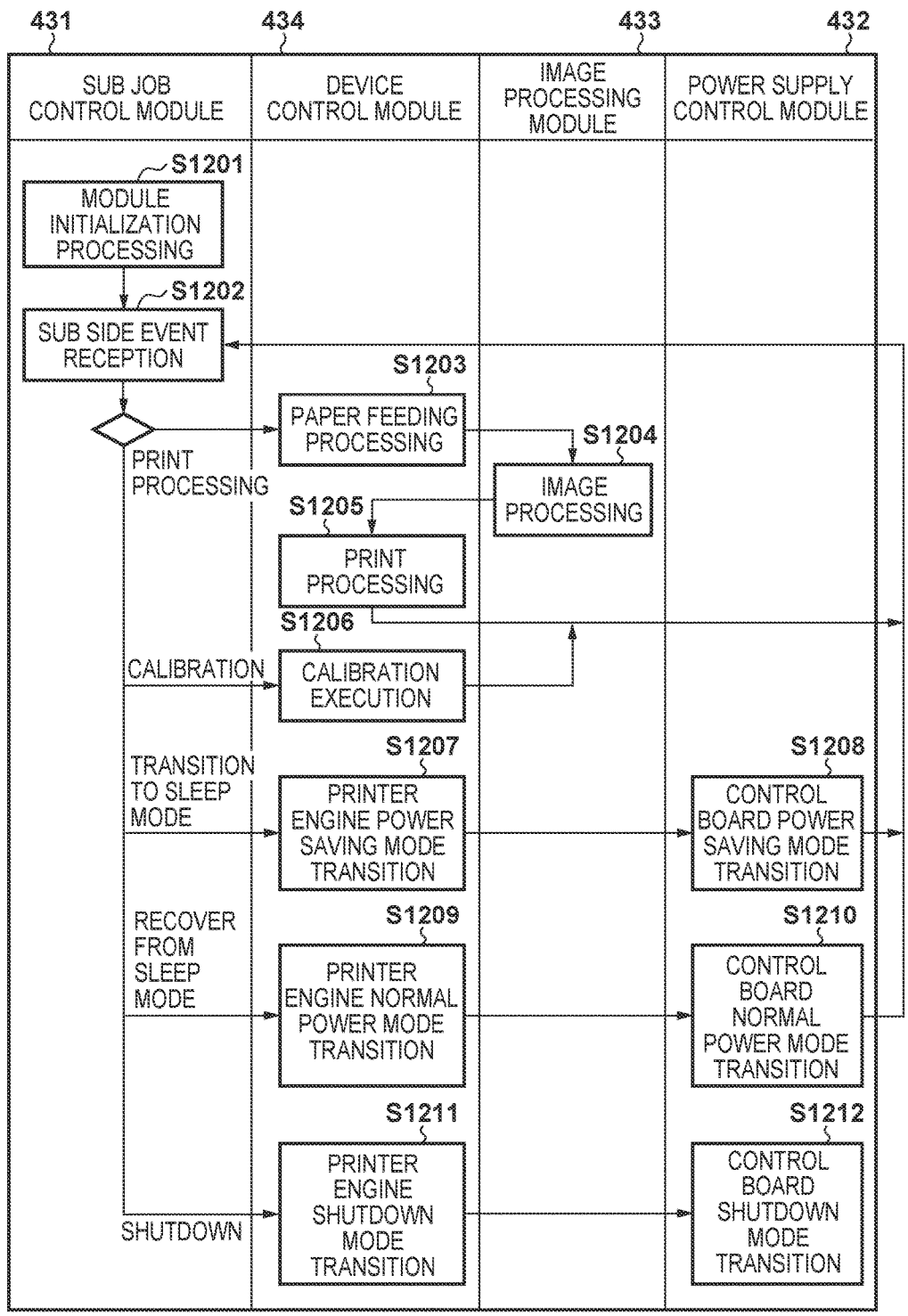
FIG. 12 is a flowchart for describing event reception processing that a sub-program executes in the image forming apparatus according to the first embodiment.

FIG. 12 is a flowchart for describing event reception processing that the sub-program 430 of the image forming apparatus 100 executes according to the first embodiment. Note that description is given by focusing on processing by the sub-program 430 here, although actually, as previously described, processing which performs a notification of a processing result of an event with the main job control module 401 is performed.

Firstly, the CPU 221 in step S1201 functions as the sub job control module 431 and performs an initialization process of each type of module. Next, the processing proceeds to step S1202 and the CPU 221 functions as the sub job control module 431 and waits to accept a new event. This wait to accept an event may be realized by polling or the like in addition to being realized by using a message queue mechanism. Here, when any event is accepted the steps below are proceeded to.

The CPU 221 proceeds to step S1203 when it detects a print processing event, functions as the device control module 434, and starts paper feeding processing. At that time, the CPU 221 controls so that a paper is fed to the printer engine 105 from the paper feed source designated by the event. Next, the processing proceeds to step S1204, and the CPU 221 functions as the device control module 434 and makes a notification so to execute image processing to the image processing module 433. Then the CPU 221 functions as the device control module 434, and executes the print processing which forms a print image by outputting image data that the image processing executed to the printer engine 105 in step S1205, and then proceeds to step S1202.

Also, the CPU 221 proceeds to step S1206 when it detects a calibration start event, functions as the device control module 434, and executes the calibration, and then proceeds to step S1202.

Also, the CPU 221 proceeds to step S1207 when it detects an event for transitioning to the sleep mode, and the CPU 221 functions as the device control module 434 and causes the printer engine 105 to transition to the power saving mode. Then, the CPU 221 functions as the power supply control module 432, causes the controller board 102 to transition to the sleep mode in step S1208, and then proceeds to step S1202.

Also, the CPU 221 proceeds to step S1209 when it detects an event for recovering from the sleep mode, and, functioning as the device control module 434, causes the printer engine 105 to transition to the normal mode. Then the processing proceeds to step S1210, and the CPU 221 functions as the power supply control module 432, causes the controller board 102 to transition to the normal mode, and then proceeds to step S1202.

Also, the CPU 221 proceeds to step S1211 when it detects a shutdown event, and functioning as the device control module 434, causes the printer engine 105 to transition to a shutdown mode. Then the processing proceeds to step S1212, and the CPU 221 functions as the power supply control module 432, and causes the controller board 102 to transition to the shutdown mode.

Figure 13:
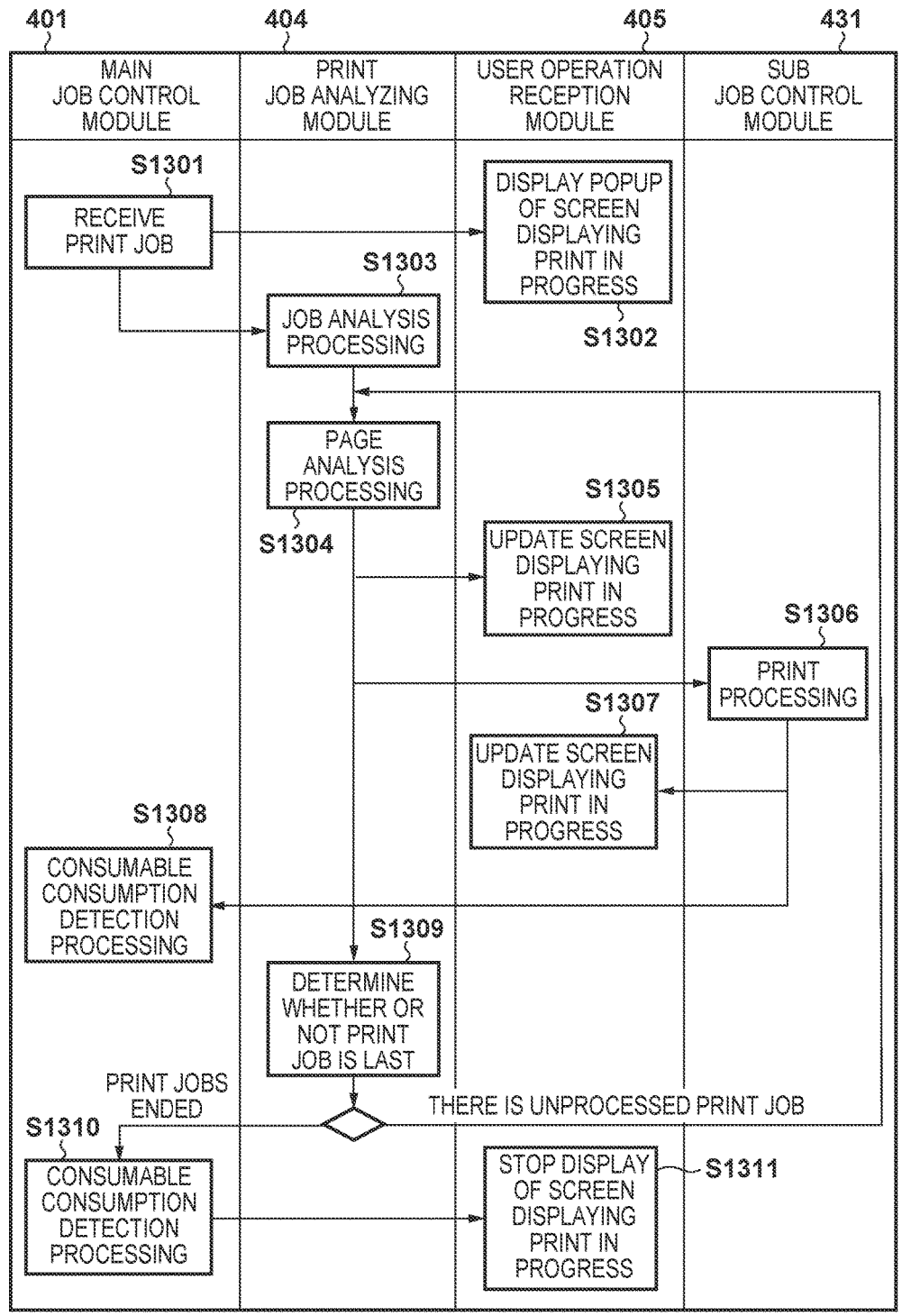
FIG. 13 is a flowchart for describing print processing that a main program as an agent executes in the image forming apparatus according to the first embodiment.

FIG. 13 is a flowchart for describing print processing that the main program 400 of the image forming apparatus 100 according to the first embodiment executes as an agent.

Firstly, the CPU 201 in step S1301 functions as the main job control module 401 and receives a print job. By this, the CPU 201 functions as the user operation reception module 405 and pop-up displays a screen which indicates that print processing is in progress in step S1302. Here, the screen 521 illustrated in FIG. 5 is displayed on the display unit 124 for example. Also, the CPU 201 functions as the print job analyzing module 404 and analyzes print data included in the print job in step S1303. Then, the processing proceeds to step S1304, and the CPU 201 functions as the print job analyzing module 404 and analyzes one page of print data. Then, the processing proceeds to step S1305 when intermediate data is created after analysis of one page's worth ends, and the CPU 201 functions as the user operation reception module 405 and updates the previously described screen 521. Also, the CPU 201 functions as the print job analyzing module 404, and makes a notification for a start of print processing to the CPU 221. By this, the CPU 221 functions as the sub job control module 431 and executes the print processing in step S1306. In this way, the processing proceeds to step S1307 when completion of one page of print processing is notified from the CPU 221, and the CPU 201 functions as the user operation reception module 405 and updates the print screen 521. Also, the processing proceeds to step S1308 when the CPU 221 makes a notification that the print processing of one page ended to the CPU 201, and the CPU 201 functions as the main job control module 401 and executes the consumption detection processing of the consumable.

Also, the CPU 201 functions as the print job analyzing module 404, and determines whether or not the processing of the last data item of the print job ended in step S1309 after analysis of one page ends. Here, the processing proceeds to step S1304 when data processing of the print job has not ended, and the CPU 201 functions as the print job analyzing module 404 to perform analysis of the next page. Meanwhile, the processing proceeds to step S1310 when it is determined that processing of the data of the print job ended in step S1309, and the CPU 201 functions as the main job control module 401 and executes the consumable consumption detection processing. Also, at that time, the CPU 201 functions as the user operation reception module 405 and hides the screen which indicates that print processing is in progress in step S1311.

Figure 14:
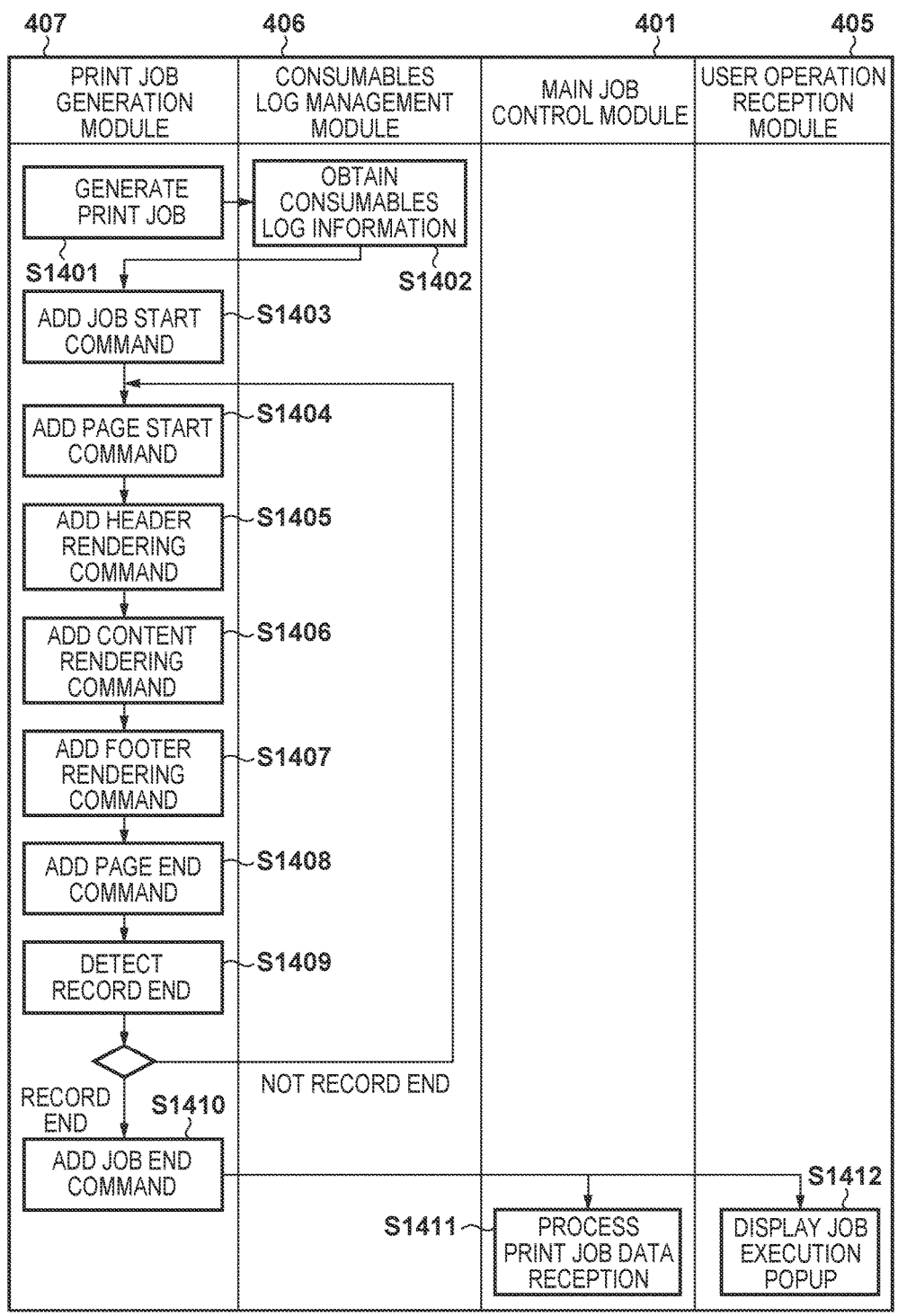
FIG. 14 is a flowchart for describing consumables log print processing that the main program of the image forming apparatus executes as an agent according to the first embodiment.

FIG. 14 is a flowchart for describing consumables log print processing that the main program 400 of the image forming apparatus 100 according to the first embodiment executes as an agent. Note, the consumables log print processing and the consumables log (details) print will be described in summary here because the processing which is realized is basically the same and it only differs by the amount of information of the print command.

Firstly, the CPU 201 functions as the print job generation module 407 when the CPU 201 accepts an execution instruction of the consumables log print to generate a print job in step S1401. Specifically, a memory area for holding the print job is allocated. Then, the CPU 201 functions as the consumables log management module 406 and obtains the consumables log information 701 through 704 held in the RAM 250 in step S1402. Here, information of each record of the print target included in the consumables log information is referenced. Next, the processing proceeds to step S1403, and the CPU 201 adds a job start command to the print job. This processing is executed for all records included in the consumables log information.

Next, the processing proceeds to step S1404, and the CPU 201 functions as the print job generation module 407 and adds a page start command to the print job. The size information of paper to print is included in the page start command for example. Also orientation information of the paper and the like is included. Next, the processing proceeds to step S1405, and the CPU 201 functions as the print job generation module 407 and adds a header portion rendering command to the print job. Here, rendering of a title of a status print or the like is performed for example. Next, the processing proceeds to step S1406, and the CPU 201 functions as the print job generation module 407, references information of a plurality of records included in the consumables log information, and adds a content portion rendering command to the print job. For example, here, information of 100 records are converted to rendering commands and added to the print job if 100 records can be rendered in one page. Next, the processing proceeds to step S1407, and the CPU 201 functions as the print job generation module 407 and adds a footer portion rendering command to the print job. Here for example, the page count is converted to a rendering command and is added to the print job. Next, the processing proceeds to step S1408, and the CPU 201 functions as the print job generation module 407 and adds a page end command to the print job. Then, the processing proceeds to step S1409, and the CPU 201 functions as the print job generation module 407 and determines whether or not the processing for all records has ended. Here, the processing proceeds to step S1404 if rendering processing has not yet been performed as content in relation to all the records, a new page is generated again, and rendering repeats. The CPU 201 proceeds to step S1410 when it determines that the processing in relation to all the records included in the consumables log information ended, and the CPU 201 functions as the print job generation module 407 and adds a job end command to the print job. Then, the CPU 201 functions as the main job control module 401 in step S1411, and executes reception processing of the print job, and also functions as the user operation reception module 405 in step S1412 and displays a screen indicating that the print job of the consumables log print is being executed. The screen displayed here is the screen as illustrated by screen 512 or 552 of FIG. 5 for example.

As described above, the main program 400 can generate a print job based on contents of the consumables log information and print this on paper by the printer engine 105.

Figure 15A:
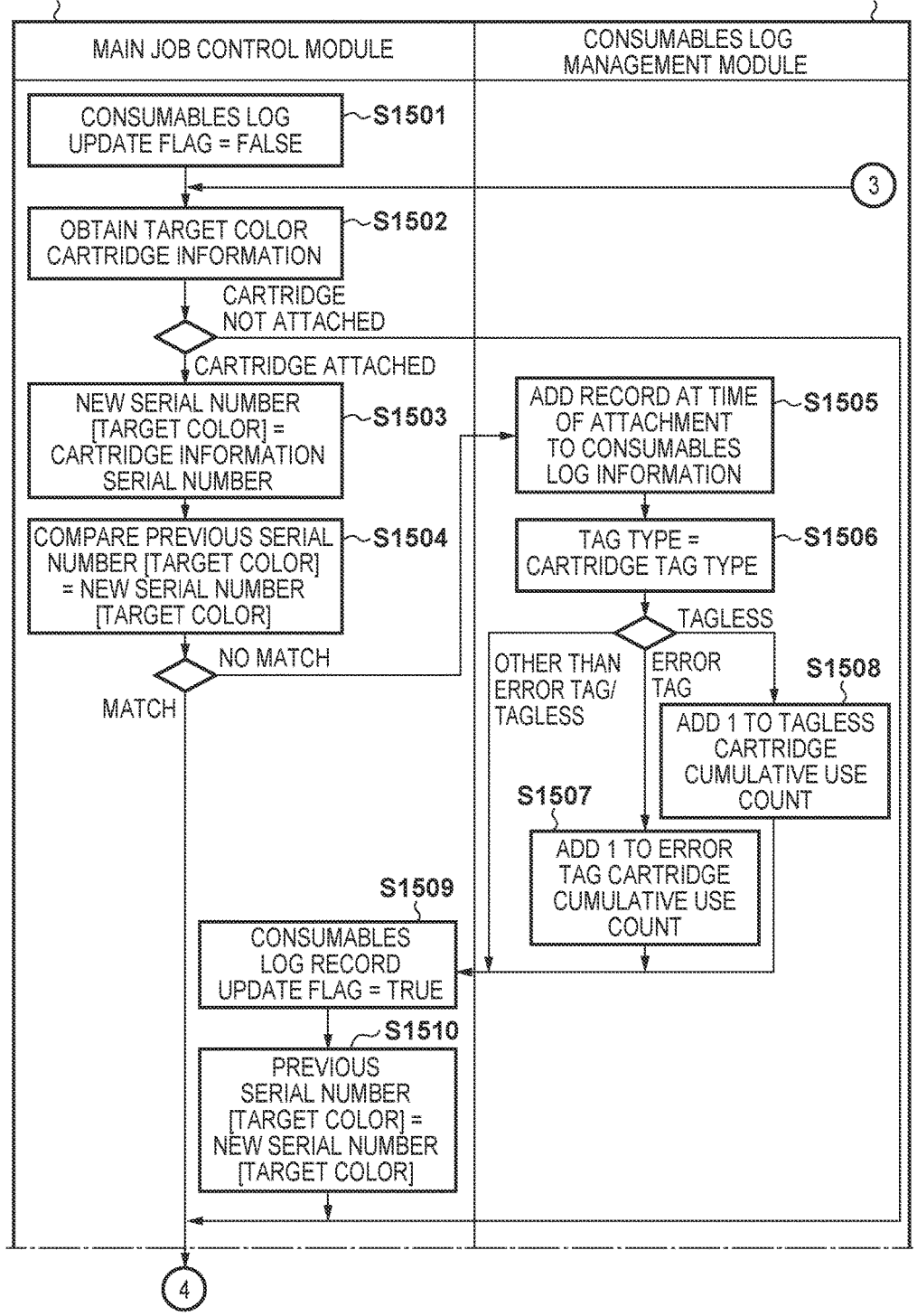

FIGS. 15A and 15B are flowcharts for describing processing of a detection of a replacement of a consumable that the main program 400 of the image forming apparatus 100 according to the first embodiment executes as an agent.

Firstly, the CPU 201 functions as a main job control module 401 and makes a consumables log update flag to be FALSE (off) in step S1501. Then, the processing below is repeatedly performed for attachable colors for every cartridge. Specifically, it is repeated for four colors for a color image forming apparatus and is repeated only one time for a monochrome image forming apparatus. Here, colors made to be targeted are referred to as "target colors". Next, the processing proceeds to step S1502, and the CPU 201 reads the cartridge information of the target colors in accordance with the flowchart illustrated in FIG. 16.

Figure 16:
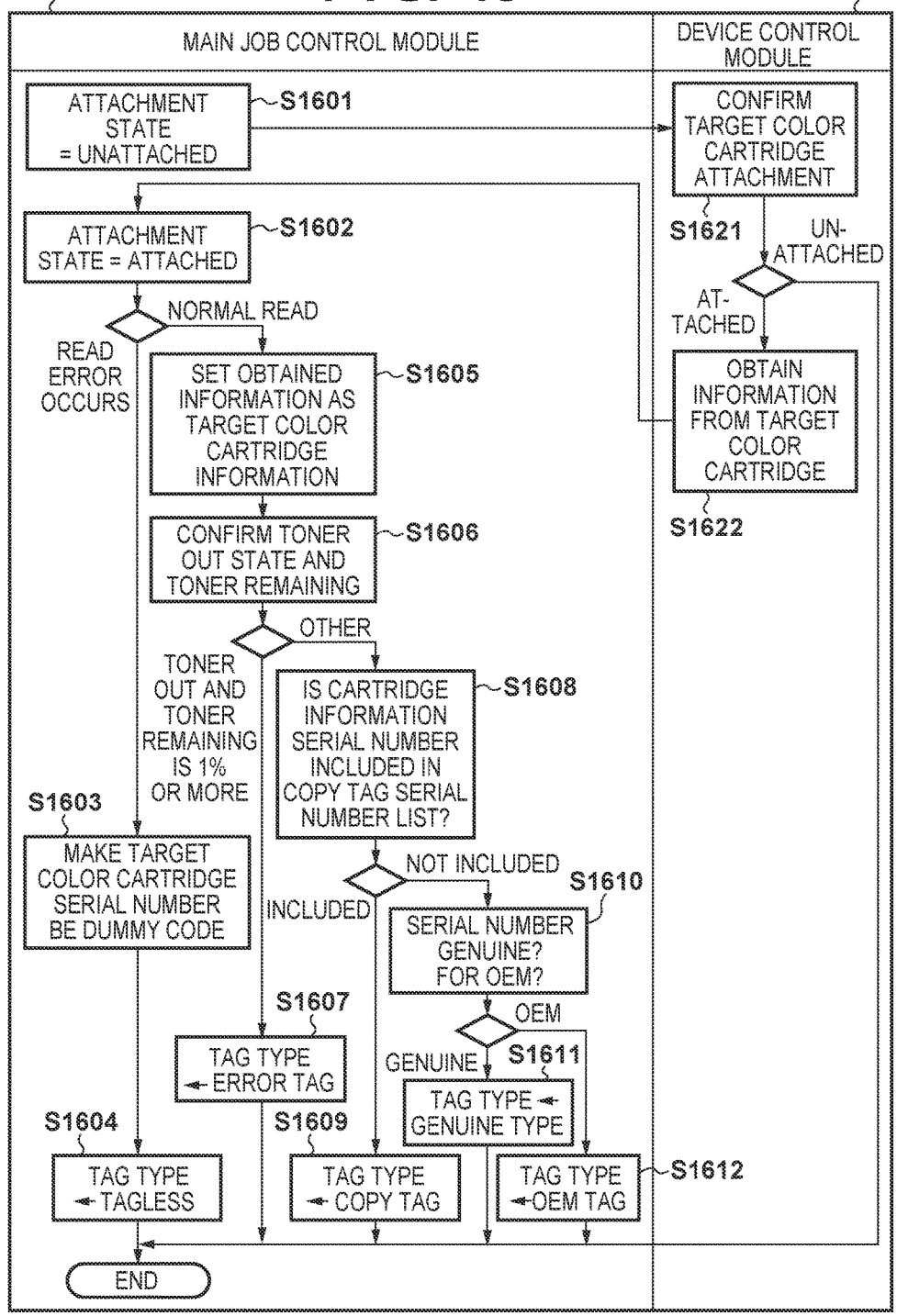
FIG. 16 is a flowchart for describing cartridge information read processing of step S1502 executed by the main program and the sub-program of the image forming apparatus according to the first embodiment.

FIG. 16 is a flowchart for describing cartridge information read processing of step S1502 executed by the main program 400 and the sub-program 430 of the image forming apparatus 100 according to the first embodiment.

Firstly, the CPU 201 functions as the main job control module 401 and makes the attachment state of the cartridge "unattached" in step S1601. Then, the CPU 201 functions as the main job control module 401 and makes a request for an obtainment of information of the cartridges and the attachment states of the cartridges of the target colors to the device control module 434. By this, the CPU 221 functions as the device control module 434 in step S1621 and confirms the attachment states of the cartridges of the target colors. Then, when it is determined that the cartridges of the target colors are unattached, a notification is made that the cartridges are unattached to the CPU 201, and the processing ends. Meanwhile, the processing proceeds to step S1622 when it is determined that the cartridges of the target colors are attached, and the CPU 221 attempts an obtainment of various information from the cartridges of the target colors. Here, obtained information is the serial numbers of the toner cartridges 310a through 310d of FIG. 8B, the remaining amount (life span) of the cartridges, the remaining amount of toner, the drum life span, the developer life span, the toner out information, and the low toner information. In this way, the CPU 221 obtains information of the cartridges and notifies that to the CPU 201 in step S1622.

With this, the processing proceeds to step S1602 and the CPU 201 functions as the main job control module 401 and makes the attachment state of the cartridges corresponding to the obtained information "attached". Here, the processing proceeds to step S1603 in a case when it is determined that a read error of the information of a cartridge occurred when obtaining the information of the cartridges, and the CPU 201 functions as the main job control module 403 and sets a dummy code (predetermined information) for the serial number of the cartridge. The dummy code is a code representing that a read error occurred, and uses a serial number not set for a cartridge normally. Then the processing proceeds to step S1604, and the CPU 201 makes the tag type of the cartridge "tagless" and ends the processing.

Meanwhile, the processing proceeds to step S1605 when the information of the cartridges could be normally obtained without a cartridge information read error, and the CPU 201 functions as the main job control module 401 and sets the obtained information as the cartridge information of the target colors. Next, the processing proceeds to step S1606, and the CPU 201 functions as the main job control module 401 and confirms the toner out information and the remaining amount of toner information. Here, in a case when the remaining amount of toner is equal to or higher than 1% even though out of toner occurred, specifically, when a contradiction in the information occurs, it is determined that the cartridge is a cartridge for which it is highly likely that a refill occurred, and the processing proceeds to step S1607. The CPU 201 functions as the main job control module 403, and makes the tag type of the cartridge "error tag" in step S1607, and then ends this processing.

Meanwhile, if out of toner has not occurred or out of toner has occurred but the remaining amount of toner is less than 1% in step S1606, the processing proceeds to step S1608.

The CPU 201 in step S1608 functions as the main job control module 401, and determines whether or not the serial number of the cartridge information is included in the copy tag serial number list 851 of FIG. 8A. Here, the CPU 201 proceeds to step S1609 when it determines that the serial number is included in the copy tag serial number list 851, and the CPU 201 functions as the main job control module 401, makes the tag type of the cartridge "copy tag", and ends the processing.

Also when, in step S1608, the CPU 201 determines that the serial number is not included in the copy tag serial number list 851, the processing proceeds to step S1610, and the CPU 201 distinguishes whether the serial number is for a first kind of cartridge (for example, a genuine one) or for a second kind of cartridge (for example, an OEM one). Here, it is distinguished whether the highest order bit of the serial number is "0" or "1" for example. Alternatively, it may be distinguished by the sum total of the number of bits of the serial number. Here, the processing proceeds to step S1611 when it is determined that it is a serial number for a genuine cartridge, and the CPU 201 functions as the main job control module 403, decides that the tag type of the cartridge is "genuine tag", and ends the processing. Meanwhile, in step S1612 the CPU 201 proceeds to step S1612 when it is determined that it is a serial number for an OEM cartridge, decides that the tag type of the cartridge is "OEM tag", and ends the processing.

Note, whether it is a genuine cartridge or an OEM cartridge is distinguished based on the serial number here. Also, configuration may also be taken such that information which identifies a genuine cartridge or a OEM cartridge is held within a memory tag, and distinguishing may be based on this.

By this processing, if the attachment state of the cartridge of the target color is detected and the cartridge is attached, obtainment of the information of the cartridge of the target color is possible.

Next, returning to FIG. 15A, the CPU 201 in step S1502 functions as the main job control module 401 and determines the attached state of the cartridge based on the obtained cartridge information. Here, the processing proceeds to step S1503 when it is determined that the cartridge is attached, and the CPU 201 makes the serial number of the cartridge information into a new serial number corresponding to a cartridge of the target color. Next, the processing proceeds to step S1504, and the CPU 201 compares the new serial number with the previous serial number which is the serial number attached at a time of the previous replacement. Then, the processing ends as is in a case when the new and previous serial numbers match.

Meanwhile, in a case when the new and previous serial numbers do not match, this time the cartridge is determined to have been replaced and the processing proceeds to step S1505. The CPU 201 in step S1505 functions as the consumables log management module 406 and adds a record of the attachment event so as to add the consumables log information. Then, the processing proceeds to step S1506, and the CPU 201 functions as the consumables log management module 406 and makes the tag type of the cartridge information to be the tag type set in the flowchart of FIG. 16. Then, the set tag type is distinguished, and the processing proceeds to step S1507 if the tag type is "error tag", and the CPU 201 functions as the consumables log management module 406, adds one (performs +1) to the error tag cartridge cumulative use count, and proceeds to step S1509. Also, the processing proceeds to step S1508 if the set tag type is "tagless", and the CPU 201 functions as the consumables log management module 406, adds one (performs +1) to the tagless cartridge cumulative use count, and proceeds to step S1509. Also, in a case when the tag type of the cartridge is other than "error tag" and "tagless", the processing proceeds to step S1509. Then, the CPU 201 functions as the main job control module 401, and makes the consumables log record update flag TRUE (on) in order to update the log record of the HDD 104 in step S1509. Then, the processing proceeds to step S1510, and the CPU 201 updates the previous serial number of the cartridge of the target color to the new serial number of the cartridge of the target color. The above processing repeats until there are no unprocessed cartridges.

In this way, the above processing for all the cartridges of the target colors is executed, and the processing proceeds to step S1511 when it is determined that the consumables log record update flag is TRUE (on). The CPU 201 functions as the consumables log management module 406, and stores the consumables log information 701 through 704 to the consumables log records 711 through 714 of the HDD 104 in step S1511. Then, the processing proceeds to step S1512, and the CPU 201 functions as the consumables log management module 406, saves contents of the cartridge cumulative use count information 705 of the RAM 250 in the cartridge cumulative use count record 715 of the HDD 104, and ends the processing.

By the above described processing, a tag type of a cartridge is distinguished when a new cartridge is attached, and the cumulative use count of the cartridge corresponding to the tag type is counted. Then, the information of the cartridge stored in the RAM can be recorded as a consumables log of the cartridge to a non-volatile storage apparatus.

Figure 17A:
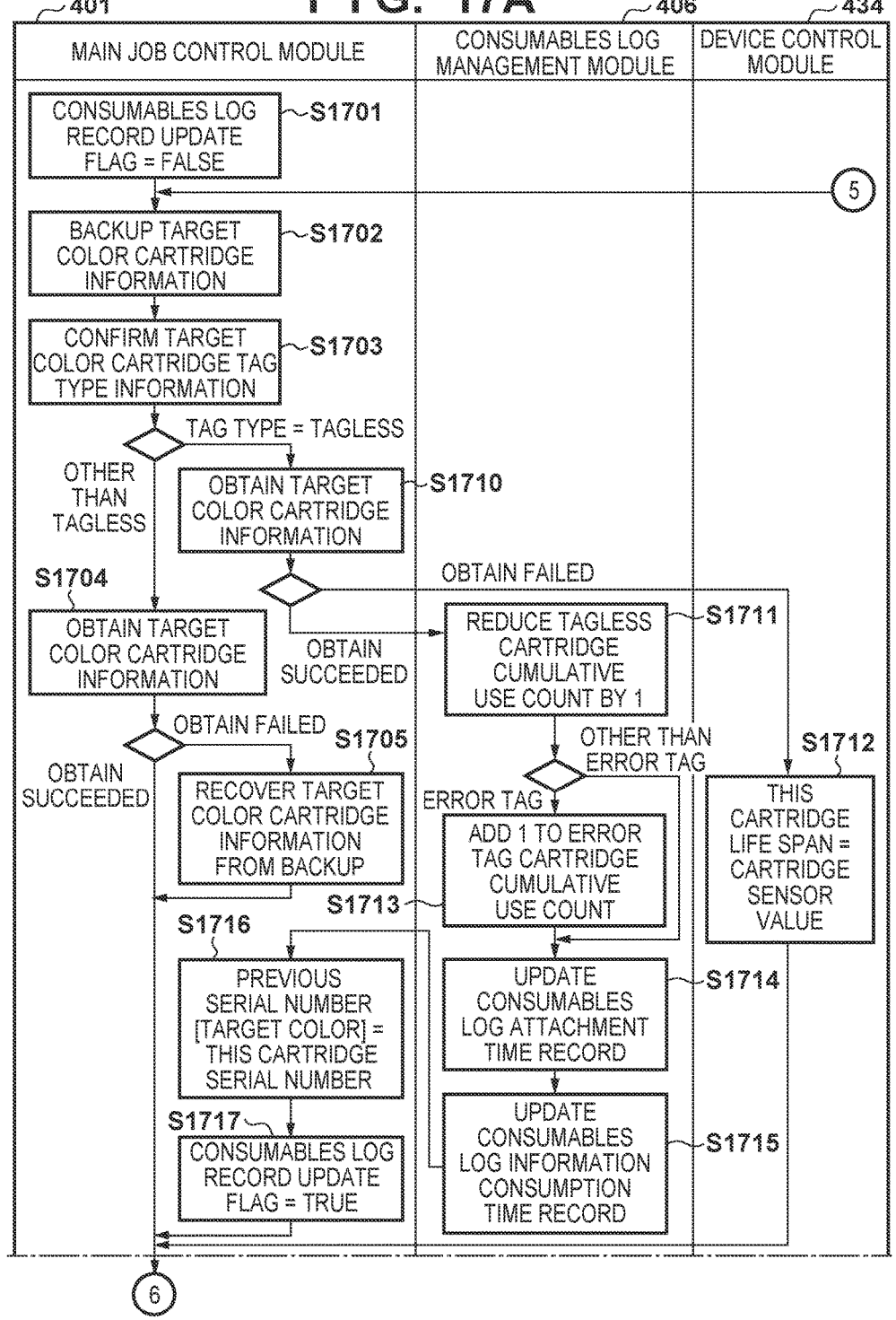
FIGS. 17A and 17B are flowcharts for describing consumable consumption detection processing that the main program of the image forming apparatus executes as according to the first embodiment.
Figure 17B:
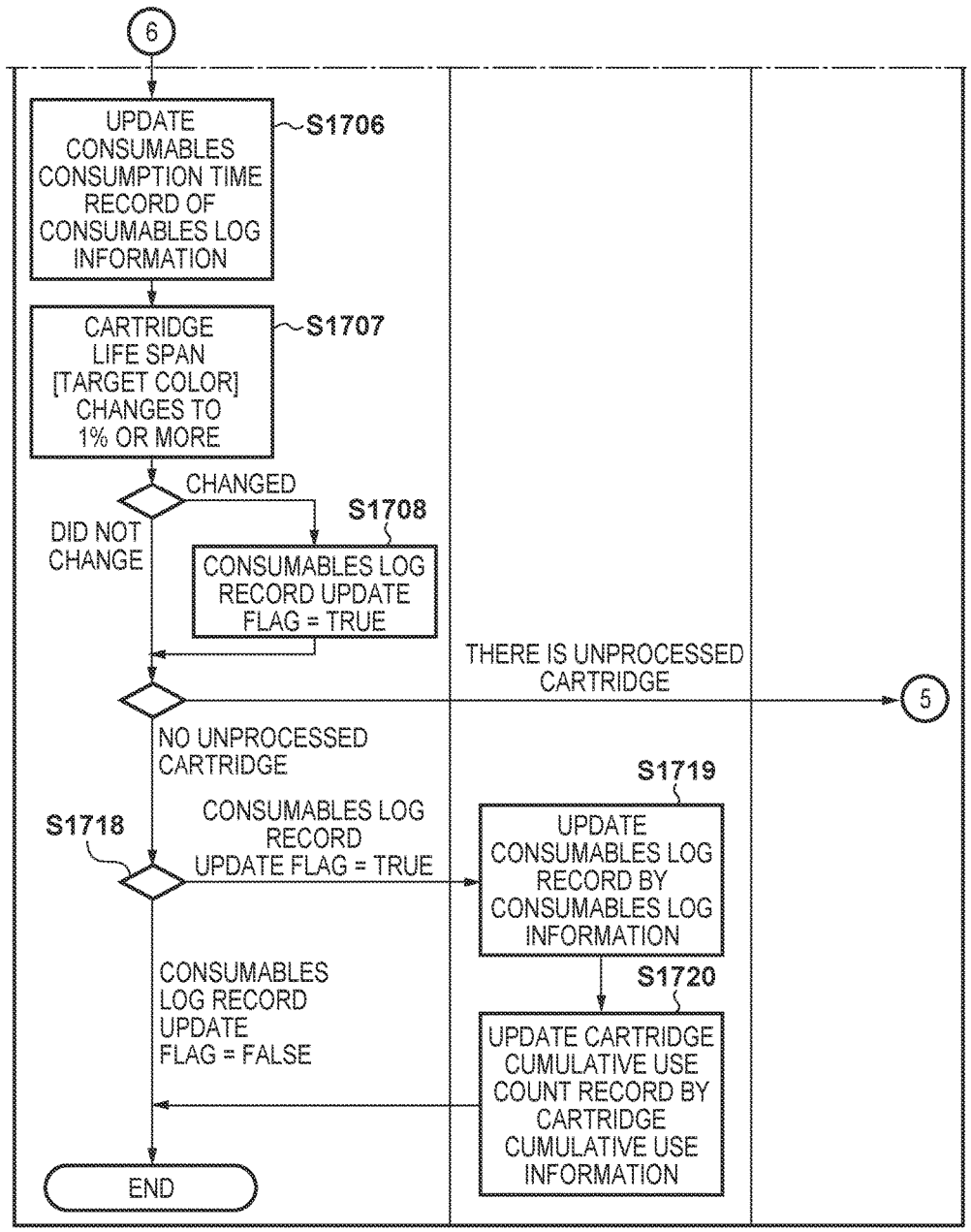

FIGS. 17A and 17B are flowcharts for describing consumable consumption detection processing that the main program 400 of the image forming apparatus 100 according to the first embodiment executes.

Firstly, in step S1701 the CPU 201 functions as the main job control module 401 and makes the consumables log record update flag to be FALSE (off). The below processing is repeated in relation to every attachable target color.

In step S1702, the CPU 201 functions as the main job control module 401 and backs up information of the cartridge of the target color. Next, the processing proceeds to step S1703, and the CPU 201 functions as the main job control module 401 and confirms the tag type of cartridge information of a cartridge of the target color. Then, the processing proceeds to step S1704 when it is determined that the tag type is other than "tagless", and the CPU 201 functions as the main job control module 401, and obtains the cartridge information of the cartridge of the target color in accordance with the procedure described in the flowchart of FIG. 16. Here, the processing proceeds to step S1706 in a case when obtainment of the cartridge information of the cartridge of the target color succeeds and the processing thereafter is performed based on the read cartridge information. Meanwhile, the processing proceeds to step S1705 in a case when obtainment of the cartridge information of the cartridge of the target color fails, and the CPU 201 recovers the cartridge information of the cartridge of the target color which was obtained from a previous backup and proceeds to step S1706. Specifically, the information of an original cartridge is employed when obtainment of the cartridge information fails.

Meanwhile, the processing proceeds to step S1710 in a case when it is determined in step S1703 that the tag information is "tagless", and the CPU 201 functions as the main job control module 403 and obtains the cartridge information of the cartridge of the target color in accordance with the flowchart described in FIG. 16. Then, the processing proceeds to step S1711 when obtainment of the cartridge information of the cartridge of the target color succeeds, and the CPU 201 functions as the consumables log management module 406, and subtracts one from the accumulated number of "tagless" cartridges. Then, the CPU 201 determines whether or not the tag type of the cartridge information is "error tag", and advances the processing to step S1714 if it is not an "error tag". Meanwhile, the processing proceeds to step S1713 if it is an "error tag", and the CPU 201 functions as the consumables log management module 406, and adds one to the cartridge cumulative use count of the error tag, and then proceeds to step S1714. The CPU 201 in step S1714 updates an attachment time record within the consumables log information based on the cartridge information for which the obtainment succeeded. Next, the processing proceeds to step S1715, and the CPU 201 updates a consumption time record within the consumables log information based on the cartridge information for which the obtainment succeeded, and then the processing proceeds to step S1716. The CPU 201 in step S1716 functions as the main job control module, and updates the previous serial number of the cartridge of the target color by the serial number of the cartridge information for which the obtainment succeeded. Next, the processing proceeds to step S1717, and the CPU 201 functions as the main job control module, makes the consumables log record update flag TRUE (on), and proceeds to step S1706. Also, in a case when the CPU 201 in step S1710 fails at obtainment of the cartridge information of the cartridge of the target color, the CPU 201 makes a notification for an obtainment of a sensor value to the CPU 221. By this, in step S1712 the CPU 221 functions as the device control module 434, obtains the remaining amount of toner from the toner sensor of the cartridge of the target color, notifies the CPU 201, and proceeds to step S1706.

The CPU 201 in step S1706 functions as the main job control module and updates a consumption time record of the consumables log information. Specifically, a new record based on the cartridge information is generated if a consumption time record corresponding to the cartridge information does not exist. Meanwhile, various information of the record is updated if a consumption time record corresponding to the cartridge information exists. Next, the processing proceeds to step S1707, and the CPU 201 determines whether or not the life span of the cartridge is changed to 1% or more. If it is determined here to have changed to 1% or more, the processing proceeds to step S1708, and the CPU 201 set the consumables log record update flag to be TRUE (on).

The above described processing repeats for all of the number of colors attachable, and then the processing proceeds to step S1718 if the processing for all attachable color cartridges is performed, and the CPU 201 determines whether or not the consumables log record update flag is TRUE. Here, the processing proceeds to step S1719 when it is determined that the consumables log record update flag is TRUE, the CPU 201 functions as the consumables log management module and updates the consumables log record of the HDD 104 by the consumables log of the RAM 250. Next, the processing proceeds to step S1720, and the CPU 201 updates the cartridge cumulative use count record of the HDD 104 by the cartridge cumulative use count information of the RAM 250 and ends the processing.

By the first embodiment as described above, a cartridge is determined to be something for which a memory tag exists if communication with the cartridge (memory tag) attached to the image forming apparatus succeeds even once, even if it fails incidentally in the time period from attachment of the cartridge to detachment. Also, it is determined that the cartridge is something for which no memory tag exists if communication with the cartridge (memory tag) attached to the image forming apparatus does not succeed even once in the interval from attachment to detachment of the cartridge. Specifically, an incidental communication error which is caused by a contact defect of a cartridge or the like and a communication error caused by the lack of a memory tag in a cartridge can be distinguished.

Second Embodiment

Next, description is given of an example of performing an existence confirmation for a memory tag of a cartridge at a timing different from the first embodiment as the second embodiment of the present invention. Note, description is omitted of the hardware configuration of the image forming apparatus 100 according to the second embodiment because it is the same as the configuration of the image forming apparatus 100 according to the previously described first embodiment.

In the previously described first embodiment, description of an example of re-checking the reading of a memory tag at a timing in which a consumable of an attached cartridge is consumed is given. Specifically, a consumable material is consumed by performing print processing and communication with a cartridge (memory tag) is executed upon a triggering of this. In such a case, it is necessary to set a timeout for example because it is unknown whether or not the hardware for communication exists. Specifically, it is determined that there is no response from the hardware if there is no response within the fixed interval. In this case, it becomes necessary to wait the time it takes for a timeout every time communication is performed. Therefore, as in the first embodiment, there is a possibility that an adverse effect on the print performance of the image forming apparatus will be caused when communication with a cartridge (memory tag) is attempted for every print page. For example, a timeout may occur for awaiting a response from the cartridge (memory tag) N times, in addition to print processing for N times, if there is data for N pages.

We will describe such case with reference to FIGS. 18A-18C.

FIGS. 18A-18C depict views for describing an example of timing at which existence confirmation of a memory tag is performed according to the second embodiment.

FIG. 18A depicts a view illustrating an example of confirming the existence of a memory tag by N pages respectively.

Here, in the image forming apparatus 100, in which the print performance of the printer engine 105 is 80 [pages/minute], a time out duration of communication with the cartridge (memory tag) is set to 100 msec. In such a case, one page can be processed in 750 msec if there is an immediate response from the cartridge (memory tag) without a timeout. However, the processing time of one page becomes 850 msec when a timeout occurs in the communication with the cartridge (memory tag) every time. Specifically, as a whole, the print performance becomes approximately 70.5 [pages/minute] and the performance deteriorates approximately 12% in relation to the print performance of the printer engine 105.

Accordingly, this influence can be reduced by holding a restriction for the number of times a timeout occurs in the communication with the cartridge (memory tag). Specifically, the number of times each cartridge of the target color is read is counted in a case when it is determined that the tag type of the cartridge (memory tag) is "tagless". Then, transition is made to a mode in which communication is not performed after determining that the memory tag does not exist in the cartridge when the number of times the reading of the cartridge (memory tag) fails is greater than or equal to a threshold value. For example, cartridge information of a cartridge of a target color is read an initial five times, and from a sixth time, it is treated as a read failure without executing obtainment processing of the cartridge information in step S1710 of FIG. 17A.

FIG. 18B describes this. In the example of FIG. 18B, configuration is taken such that cartridge information of a cartridge of a target color is read an initial five times (pages), and from a sixth time (page), an obtainment of the cartridge information is not performed.

Also, a configuration is made in which it is possible to attempt communication for only confirming the existence of the tag of the cartridge (memory tag) and suppress the influence on the print performance in timing of other than for a print. For example, generally an image forming apparatus will have many modes for saving power such as a sleep mode. Often such things that, for example, a print job not being input or the image forming apparatus 100 not be operated for a fixed interval or more are applied as conditions for transitioning from a normal mode to a power saving mode.

Accordingly, it is possible to attempt communication with a cartridge a plurality of times within a time period until transitioning to a sleep mode from an end of a print by a print job. For example, a state for obtaining the cartridge information is transitioned to when a confirmation time of the cartridge which is shorter than the time period to transition to the sleep mode from the last input of a key has elapsed. In the state for obtaining the cartridge information, obtainment of the cartridge information for a cartridge of which the tag type is "tagless" is attempted. After this, the image forming apparatus 100 transitions to the sleep mode via a state of transitioning to the sleep mode when the time period for transitioning to the sleep mode has elapsed.

This state is illustrated in FIG. 18C. Thereby, is it possible to confirm the existence of a memory tag at a timing that does not have an influence on the print performance of the image forming apparatus.

In addition, it also possible to take a separate configuration to test the existence of a memory tag at a timing of a consumables log print, or to test it in a power off sequence or a time of cartridge attachment.

Third Embodiment

In the first embodiment described above, description is given of an example of print processing by the print job generation module 407 as a consumables log output means. However, the output means of the present invention is not limited to a print. For example, the output means of the present invention may display on the display unit 124 of the operation unit 101. Alternatively, configuration may be taken such that a Web page capable of displaying on a Web browser operated by the PC 150 is generated and provided to an information processing apparatus such as a PC or the like. In addition, storage in the USB memory 130 and transmission to the PC 150 at regular intervals or at a particular timing are also possible. The data format in such cases can use an XML (Extensible Markup Language) format. Also, a JSON (JavaScript Object Notation) format may be used as the data format. Furthermore, any text format including a CSV (comma-separated values) format or a TSV (Tab-separated values) format as the data format and may be used. Furthermore, a particular data format such as an independent binary data format may be applied as the data format. In addition, transmission by electronic mail or the like may be used as the output means.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214810, filed Oct. 30, 2015 which is hereby incorporated by reference herein in its entirety.

What is claimed is:

1. An image forming apparatus that attaches a consumable including a memory that stores information for indicating use results of a consumable material and including identification information of the consumable, and that forms an image by using the consumable material accommodated in the consumable, the image forming apparatus comprising:
    at least one processor; and
    at least one memory storing instructions which, when the instructions are executed by the at least one processor, cause the image forming apparatus to:
    obtain the information from an attached consumable repeatedly;
    create a record, including the identification information of the attached consumable, of the attached consumable based on the obtained information in a case that an obtaining of the information succeeds in an obtainment of the information, and create a record of the attached consumable that makes the identification information of the attached consumable be predetermined information other than the identification information in a case that the obtaining of the information fails in the obtainment of the information; and change the identification information of the consumable in the record based on the information that is currently obtained in a case that identification information of the attached consumable included in the information that is currently obtained does not match the identification information of the consumable in the record, wherein the change does not occur until the identification information of the attached consumable included in the information that is currently obtained does not continuously match the identification information of the consumable in the record in a predetermined number of times in the repeatedly obtaining of the information.

2. The image forming apparatus according to claim 1, the at least one processor and the at least one memory further cause the image forming apparatus to obtain the information from the attached consumable when a consumption of the consumable material accommodated in the attached consumable is detected and to update a record of the consumable based on the obtained information.

3. The image forming apparatus according to claim 2, the at least one processor and the at least one memory further cause the image forming apparatus to detect the consumption of the consumable material of the attached consumable, wherein the image forming apparatus updates the record of the attached consumable in accordance with the detection of the consumption of the consumable material.

4. The image forming apparatus according to claim 1, the at least one processor and the at least one memory further cause the image forming apparatus to detect an attachment of the consumable, wherein the image forming apparatus obtains the information in accordance with a detection of the attachment of the consumable.

5. The image forming apparatus according to claim 1, wherein the consumable is a toner cartridge, and the consumable material includes toner, a photosensitive drum, and a developer.

6. The image forming apparatus according to claim 5, wherein the information further includes information relating to a remaining amount of the toner, the photosensitive drum, and a life span of the developer.

7. The image forming apparatus according to claim 1, the at least one processor and the at least one memory further cause the image forming apparatus to, based on the information, store log information of the attached consumable in association with the identification information of the attached consumable and a cumulative use count of the attached consumable.

8. The image forming apparatus according to claim 1, wherein the image forming apparatus sets a time until the information from the attached consumable is obtained and, when a timeout where the information is not obtained within the time occurs, the image forming apparatus treats obtainment of the information as having failed.

9. The image forming apparatus according to claim 8, wherein the image forming apparatus, when a number of times of the timeout is greater than or equal to a threshold value, does not execute processing for obtaining the information thereafter.

10. The image forming apparatus according to claim 1, further comprising an output unit configured to output the record of the consumable.

11. A method of controlling an image forming apparatus that attaches a consumable including a memory that stores information for indicating use results of a consumable material and including identification information of the consumable, and that forms an image by using the consumable material accommodated in the consumable, the method comprising:

obtaining the information from an attached consumable repeatedly;

in a case that the obtaining of the information succeeds, creating a record, including the identification information of the attached consumable, of the attached consumable based on the obtained information, and in a case that the obtaining of the information fails, creating a record of the attached consumable that makes the identification information of the attached consumable be predetermined information other than the identification information; and in a case that identification information of the attached consumable included in the obtained information does not match identification information of the consumable in the record, changing the identification information of the consumable in the record based on the information obtained currently, wherein the change does not occur until the identification information of the attached consumable included in the information that is currently obtained does not continuously match the identification information of the consumable in the record in a predetermined number of times in the repeatedly obtaining of the information.

12. A non-transitory computer readable storage medium storing a program for causing a processor to execute a method of controlling an image forming apparatus that attaches a consumable including a memory that stores information for indicating use results of a consumable material and including identification information of the consumable, and that forms an image by using the consumable material accommodated in the consumable, the method comprising:

obtaining the information from an attached consumable repeatedly;

in a case that the obtaining of the information succeeds, creating a record, including the identification information of the attached consumable, of the attached consumable based on the obtained information, and in a case that the obtaining of the information fails, creating a record of the attached consumable that makes the identification information of the attached consumable be predetermined information other than the identification information; and in a case that identification information of the attached consumable included in the obtained information does not match identification information of the consumable in the record, changing the identification information of the consumable in the record based on the information obtained currently, wherein the change does not occur until the identification information of the attached consumable included in the information that is currently obtained does not continuously match the identification information of the consumable in the record in a predetermined number of times in the repeatedly obtaining of the information.

13. An image forming apparatus that is configured to have a consumable including a memory including identification information of the consumable, and that forms an image by using the consumable material in the consumable, the image forming apparatus comprising:

at least one processor; and at least one memory storing instructions that, when the instructions are executed by the at least one processor, cause the image forming apparatus to:

obtain information from an attached consumable repeatedly;

record a record regarding identification information of the consumable in accordance with success or failure of an obtainment of the information; and change identification information of the consumable output from the consumable in accordance with the record, wherein the change does not occur until the record indicates the obtainments of the identification of the consumable were continuously failed in a predetermined number of times.

* * * * *